US012519274B2

(12) United States Patent
Noguchi et al.

(10) Patent No.: US 12,519,274 B2
(45) Date of Patent: Jan. 6, 2026

(54) CONNECTOR SET AND CONNECTOR

(71) Applicant: IRISO ELECTRONICS CO., LTD., Yokohama (JP)

(72) Inventors: Daisuke Noguchi, Yokohama (JP); Yoshihito Okuma, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 383 days.

(21) Appl. No.: 18/187,747

(22) Filed: Mar. 22, 2023

(65) Prior Publication Data

US 2023/0344177 A1 Oct. 26, 2023

(30) Foreign Application Priority Data

Mar. 23, 2022 (JP) ................................ 2022-047465

(51) Int. Cl.
*H01R 13/648* (2006.01)
*H01R 12/71* (2011.01)
*H01R 13/6585* (2011.01)
*H01R 13/631* (2006.01)

(52) U.S. Cl.
CPC ....... *H01R 13/6585* (2013.01); *H01R 12/716* (2013.01); *H01R 13/6315* (2013.01)

(58) Field of Classification Search
CPC .............. H01R 13/6585; H01R 12/716; H01R 13/6315; H01R 12/91; H01R 12/57; H01R 13/6471; H01R 13/6594; H01R 12/73; H01R 13/6461; H01R 13/6581
See application file for complete search history.

(56) References Cited

U.S. PATENT DOCUMENTS

| | | | | |
|---|---|---|---|---|
| 5,620,340 A * | 4/1997 | Andrews | H01R 13/6585 439/607.1 |
| 6,116,926 A * | 9/2000 | Ortega | H01R 13/6471 439/857 |
| 9,478,924 B2 * | 10/2016 | Tamai | H01R 12/716 |
| 2002/0022401 A1 * | 2/2002 | Ramey | H01R 13/6585 439/607.1 |
| 2009/0029592 A1 * | 1/2009 | Matsuzaki | H01R 13/26 439/607.01 |
| 2009/0227149 A1 * | 9/2009 | Ma | H01R 12/716 439/658 |

(Continued)

FOREIGN PATENT DOCUMENTS

JP 2004192939 A 7/2004

OTHER PUBLICATIONS

Extended European Search Report, for European Patent Application No. 23163664.8, dated Jul. 19, 2023, 9 pages.

*Primary Examiner* — Abdullah A Riyami
*Assistant Examiner* — Nelson R. Burgos-Guntin
(74) *Attorney, Agent, or Firm* — Westman, Champlin & Koehler, P.A.

(57) ABSTRACT

Each of plural first terminal sets provided to a first connector includes a first signal terminal including a shielded portion, and a first ground terminal including a shielding portion. From out of two mutually adjacent first terminal sets, the shielding portion of the one first terminal set and the shielding portion of the other first terminal set are configured so as to be electrically contiguous by direct contact, or electrically contiguous through an electrical continuity interposer portion provided to a second connector.

11 Claims, 18 Drawing Sheets

(56) References Cited

U.S. PATENT DOCUMENTS

| | | | | |
|---|---|---|---|---|
| 2014/0187098 | A1* | 7/2014 | Kobayashi | H01R 12/91<br>439/660 |
| 2014/0377992 | A1* | 12/2014 | Chang | H01R 13/6594<br>439/607.1 |
| 2015/0194751 | A1* | 7/2015 | Herring | H04Q 1/15<br>439/78 |
| 2016/0028189 | A1* | 1/2016 | Resendez | H01R 24/66<br>439/607.01 |
| 2016/0141807 | A1* | 5/2016 | Gailus | H01R 13/6586<br>439/607.05 |
| 2018/0013240 | A1* | 1/2018 | Takeuchi | H01R 13/05 |
| 2018/0054029 | A1 | 2/2018 | Lappoehn | |
| 2020/0106202 | A1 | 4/2020 | Consoli et al. | |
| 2021/0257759 | A1* | 8/2021 | Cheng | H01R 12/7082 |

* cited by examiner

CONNECTOR SET AND CONNECTOR

CROSS-REFERENCE TO RELATED APPLICATION

This application claims priority under 35 USC 119 from Japanese Patent application No. 2022-047465 filed on Mar. 23, 2022, the disclosure of which is incorporated by reference herein in its entirety.

TECHNICAL FIELD

The present disclosure relates to a connector set and a connector.

BACKGROUND ART

A connector described in Japanese Patent Application Laid-Open (JP-A) No. 2004-192939 includes a first connector (receptacle connector) and a second connector (plug connector). Each of the connectors includes a signal terminal, and a ground terminal provided corresponding to the signal terminal. The ground terminal suppress crosstalk between the signal terminals.

SUMMARY OF INVENTION

Technical Problem

In the above connector set the ground terminals are disposed in close proximity to each other, and so there is a concern that resonance might occur between the adjacent ground terminals. In particular, there is a concern that so-called parallel plate resonance might occur due to flat plate portions provided to the ground terminals opposing each other both parallel and in close proximity. Resonance is a cause of noise.

An issue addressed by the present disclosure is to provide a connector set and a first connector in which crosstalk can be suppressed and resonance is not liable to occur.

Solution to Problem

A connector set according to a first aspect is a connector set including a first connector and a second connector that are mutually connectable. The first connector includes plural first terminal sets. Each of the plural first terminal sets includes a first signal terminal and a first ground terminal. The second connector includes plural second signal terminals. The first signal terminal includes a shielded portion. The first ground terminal includes a shielding portion. Focusing on two mutually adjacent first terminal sets from out of the plural first terminal sets, part of the shielding portion of one of these first terminal sets and part of the shielding portion of the other of these first terminal sets are disposed in a state opposing each other between the shielded portion of the one first terminal set and the shielded portion of the other first terminal set. The shielding portion of the one first terminal set and the shielding portion of the other first terminal set are configured so as to be electrically contiguous by direct contact, or electrically contiguous through an electrical continuity interposer portion provided to the second connector.

The connector set according to the present aspect includes the mutually connectable first connector and second connector.

The first connector includes the plural first terminal sets. Each of the plural first terminal sets includes a first signal terminal and a first ground terminal. The first signal terminal includes a shielded portion, and the first ground terminal includes a shielding portion.

In a case of focusing on two adjacent first terminal sets from among the plural first terminal sets, part of the shielding portion of one of the two adjacent first terminal sets and part of the shielding portion of the other of the two adjacent first terminal sets are disposed in a state opposing each other between the shielded portion of the one of the two adjacent first terminal sets and the shielded portion of the other of the two adjacent first terminal sets.

Crosstalk between the first signal terminals is accordingly suppressed.

The shielding portion of the one of the two adjacent first terminal sets and the shielding portion of the other of the two adjacent first terminal sets are configured so as to be electrically connected by direct contact, or electrically connected via an electrical continuity interposer portion provided at the second connector.

Namely, the two adjacent shielding portions are electrically connected in the connector set in a state in which at least the first connector is connected to the second connector (hereafter referred to as a connector connected state).

This means that resonance between the two adjacent shielding portions can be suppressed compared to embodiments in which the two adjacent shielding portions are not electrically connected in the connector set in the connector connected state.

Note that shielding portion means a portion that shields part of the first signal terminal (a shielded portion), and the shielded portion means a portion shielded by the shielding portion. In an exemplary embodiment described later an example is described in which a movable-side shielding portion corresponds to the "shielding portion", and the movable-side retained portion and the leading-end-side portions correspond to the "shielded portion", however the "shielding portion" and the "shielded portion" of the present aspect are not limited thereto. For example, the movable-side retained portion is not necessarily a shielded portion, and a resilient support portion of the leading-end-side portions is not necessarily a shielded portion. Namely, the shielding portion of the present aspect may be any portion that shields at least part of the first signal terminal.

Moreover, although in the exemplary embodiment described later an example is described in which two adjacent shielding portions are configured so as to be electrically connected via an electrical continuity interposer portion provided at the second connector, the present aspect may be configured such that two adjacent shielding portions are electrically connected by direct contact therebetween, as described above. In such cases the second connector may omit the electrical continuity interposer portion.

Moreover, although in the exemplary embodiment described later an example is described in which the first connector includes plural (eight) first terminal sets and does not include other terminals, the present aspect is not limited thereto. The first connector may include other terminals not belonging to the "plural first terminal sets".

Moreover, although in the exemplary embodiment described later an example is described in which the first connector is a floating connector, the first connector of the present aspect is not necessarily a floating connector.

Moreover, although in the exemplary embodiment described later an example is described in which the electrical continuity interposer portion is part of the second ground terminal of the second connector, the present aspect is not limited thereto. The electrical continuity interposer portion of the present aspect may be a member formed as a separate body to the second ground terminal.

Moreover, although in the exemplary embodiment described later an example is described in which all of the shielding portions provided at the first connector are electrically connected in the connector set in the connector connected state, the present aspect is not limited thereto. Some of the plural shielding portions provided at the first connector being electrically connected in the connector set is sufficient.

A connector set according to a second aspect is the first aspect, wherein the shielding portion of the one first terminal set and the shielding portion of the other first terminal set are configured so as to be electrically contiguous through the electrical continuity interposer portion.

In the present aspect, the shielding portion of the one first terminal set and the shielding portion of the other first terminal set are configured so as to be electrically contiguous through the electrical continuity interposer portion.

This thereby facilitates realizing a stable electrically contiguous state of the two adjacent shielding portions compared to embodiments configured such that the two adjacent shielding portions are electrically contiguous by being in direct contact.

The connector set according to the third aspect is the first aspect or the second aspect, wherein the shielding portion includes an electrical continuity contact portion for making contact with a counterpart contact that is an electrical continuity contact portion provided to the shielding portion of the first terminal set adjacent to the first terminal set provided with the shielding portion, or that is the electrical continuity interposer portion serving as the counterpart contact, and the electrical continuity contact portion has a shape projecting toward the counterpart contact.

In the present aspect, the shielding portion includes the electrical continuity contact portion for making contact with the counterpart contact that is the electrical continuity contact portion provided to the shielding portion of the first terminal set adjacent to the first terminal set provided with the shielding portion from out of the plural first terminal sets, or that is the electrical continuity interposer portion serving as the counterpart contact. The electrical continuity contact portion has a shape projecting toward the counterpart contact.

This thereby enables contact between the electrical continuity contact portion and the counterpart contact to be secured.

A connector set according to a fourth aspect is the first aspect, wherein the shielding portion of the one first terminal set and the shielding portion of the other first terminal set are configured so as to be electrically contiguous through the electrical continuity interposer portion, the shielding portion includes an electrical continuity contact portion for making contact with the electrical continuity interposer portion serving as a counterpart contact, the electrical continuity contact portion has a shape projecting toward the counterpart contact, and the electrical continuity interposer portion has a flat plate shape, with flat faces on both sides of the electrical continuity interposer portion contacting the electrical continuity contact portion.

In the present aspect the electrical continuity interposer portion has a flat plate shape, with flat faces on both sides thereof contacting the electrical continuity contact portion.

This facilitates forming the electrical continuity interposer portion.

Note that although a contact position on a flat face on one side of the electrical continuity interposer portion and a contact position on a flat face on the other side thereof are preferably at the same position, the present aspect is not limited thereto.

The connector set according to a fifth aspect is the third aspect or fourth aspect, wherein the electrical continuity contact portion includes a contact point portion that makes contact with the counterpart contact, and plural coupling portions that couple the contact point portion and a portion of the shielding portion other than the electrical continuity contact portion together.

In the present aspect the electrical continuity contact portion includes the contact point portion that makes contact with the counterpart contact and the plural coupling portions. Each of the plural coupling portions couples the contact point portion and the portion of the shielding portion other than the electrical continuity contact portion together.

This accordingly enables resonance between two adjacent shielding portions to be more effectively suppressed from occurring compared to embodiments including a single coupling portion.

A connector set according to a sixth aspect is any one of the first to fifth aspects, wherein the plural first terminal sets are configured by first terminal sets disposed as a pair opposing each other in the inter-row direction, with plural of the pairs arrayed along an array direction. The shielding portion includes an inter-row direction shielding portion disposed at an inter-row direction inside with respect to the shielded portion, and a pair of array direction shielding portions disposed at both array direction sides with respect to the shielded portion. Two inter-row direction shielding portions are arranged between two of the shielded portions adjacent in the inter-row direction, and two array direction shielding portions are arranged between two of the shielded portions adjacent in the array direction.

In the present aspect, the plural first terminal sets are configured by the first terminal sets disposed as a pair opposing each other in the inter-row direction, with plural of the pairs arrayed along the array direction.

The shielding portion includes the inter-row direction shielding portion disposed at the inter-row direction inside with respect to the shielded portion, and the pair of array direction shielding portions disposed at both array direction sides with respect to the shielded portion. The two inter-row direction shielding portions are arranged between the two inter-row direction adjacent shielded portions, and the two array direction shielding portions are arranged between the two array direction adjacent shielded portions.

This accordingly enables crosstalk to be suppressed effectively in cases in which the plural first terminal sets are configured by the first terminal sets disposed as a pair opposing each other in the inter-row direction, with plural of the pairs arrayed along the array direction.

A connector set according to a seventh aspect is the sixth aspect, wherein the shielding portion of the one first terminal set and the shielding portion of the other first terminal set make direct contact with each other at a position between the array direction shielding portion of the one first terminal set and the array direction shielding portion of the other first terminal set, or the electrical continuity interposer portion is inserted between the array direction shielding portion of the one first terminal set and the array direction shielding portion of the other first terminal set such that the array direction shielding portions are electrically contiguous through the electrical continuity interposer portion.

In the present aspect, focusing on two mutually adjacent first terminal sets, the shielding portion of the one first terminal set and the shielding portion of the other first terminal set make direct contact with each other at a position between the array direction shielding portion of the one first terminal set and the array direction shielding portion of the other first terminal set. Alternatively, the electrical continuity interposer portion is inserted between the array direction shielding portion of the one first terminal set and the array direction shielding portion of the other first terminal set such that the array direction shielding portions are electrically contiguous through the electrical continuity interposer portion.

This thereby enables resonance by the array direction shielding portions to be particularly suppressed from out of the inter-row direction shielding portions and the array direction shielding portions provided to the shielding portion. As a result thereof, the first terminal sets can be arrayed at a narrow interval in the array direction, and first connector can accordingly be made more compact in the array direction.

A connector set according to an eighth aspect is any one of the first aspect to the eighth aspect, wherein the shielded portion includes a contact portion for making contact with the second signal terminal.

In the present aspect, the shielded portion includes the contact portion for making contact with the second signal terminal.

This thereby enables crosstalk between the first signal terminals to be suppressed effectively.

A connector set according to a ninth aspect is any one of the first to eighth aspects, wherein the first connector is a connector employed mounted to a first mounting target, and the shielded portion is movable with respect to the first mounting target.

In the present aspect the first connector is employed mounted to the first mounting target, and the shielding portions are able to move with respect to the first mounting target.

This thereby enables a floating connector to be applied to the first connector.

A first connector according to a tenth aspect is a first connector configured to be connectable to a second connector. The first connector includes plural first terminal sets. The plural first terminal sets each include a first signal terminal, and a first ground terminal. The first signal terminal includes a shielded portion. The first ground terminal includes a shielding portion. Focusing on two mutually adjacent first terminal sets from out of the plurality of first terminal sets, part of the shielding portion of one of these first terminal sets and part of the shielding portion of the other of these first terminal sets are disposed in a state opposing each other between the shielded portion of the one first terminal set and the shielded portion of the other first terminal set. The shielding portion of the one first terminal set and the shielding portion of the other first terminal set are configured so as to be electrically contiguous by direct contact, or to be electrically contiguous through an electrical continuity interposer portion provided to the second connector.

The first connector according to the present aspect is the first connector configured to be connectable to the second connector.

The first connector includes the plural first terminal sets. Each of the plural first terminal sets includes the first signal terminal and the first ground terminal. The first signal terminal includes the shielded portion and the first ground terminal includes the shielding portion.

Focusing on two mutually adjacent first terminal sets from out of the plural first terminal sets, part of the shielding portion of one of these first terminal sets and part of the shielding portion of the other of these first terminal sets are disposed in a state opposing each other between the shielded portion of the one first terminal set and the shielded portion of the other first terminal set.

Crosstalk between the first signal terminals is suppressed thereby.

The shielding portion of the one first terminal set and the shielding portion of the other first terminal set are configured so as to be electrically contiguous by direct contact, or to be electrically contiguous through the electrical continuity interposer portion provided to the second connector.

Namely, the two adjacent shielding portions are electrically contiguous in the connector set in the connector connected state.

This accordingly enables resonance between the two adjacent shielding portions to be suppressed compared to embodiments in which the two adjacent shielding portions are not electrically contiguous in the connector set in the connector connected state.

DESCRIPTION OF EMBODIMENTS

Description follows regarding a connector set 100, 200 that is an exemplary embodiment of a connector set of the present disclosure.

In each of the drawings arrow X is sometimes referred to as a connector front-rear direction, arrow Y as a connector width direction, and arrow Z as a connector up-down direction.

Connector Set 100, 200

Figure 1:
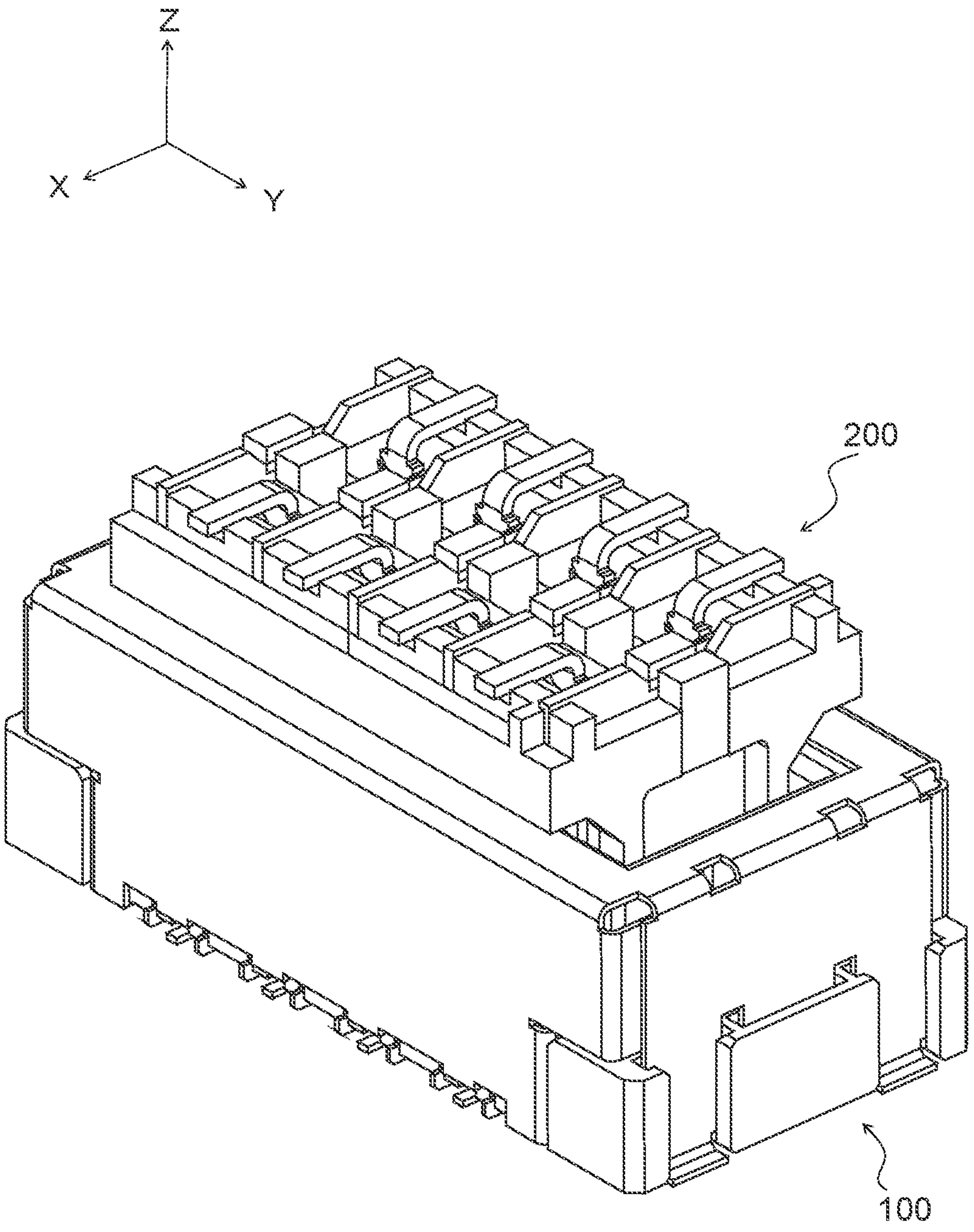
FIG. 1 is a perspective view illustrating a connector set in a connected state.
Figure 2:
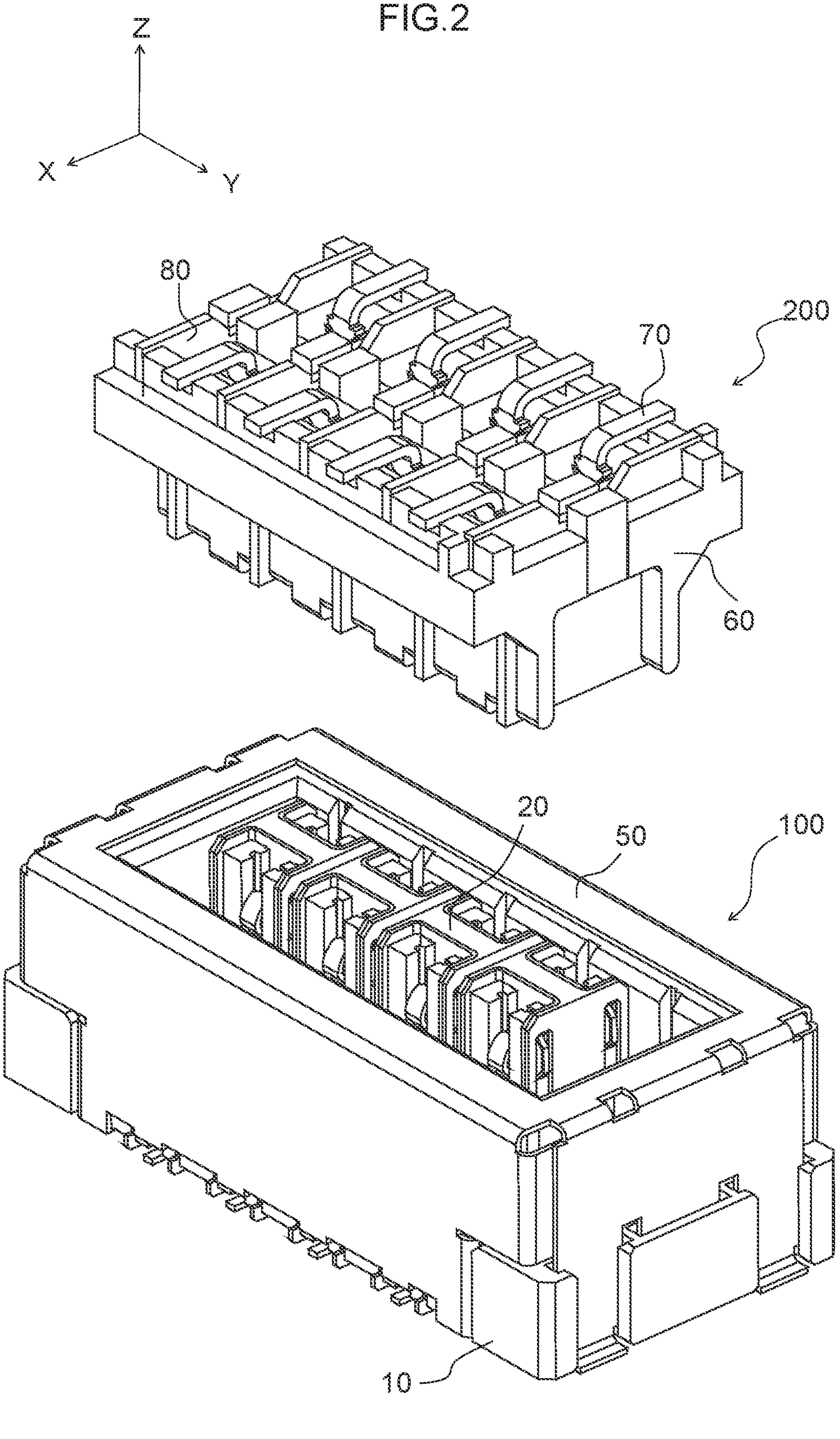
FIG. 2 is a perspective view illustrating a connector set in a state prior to connection.
Figure 3:
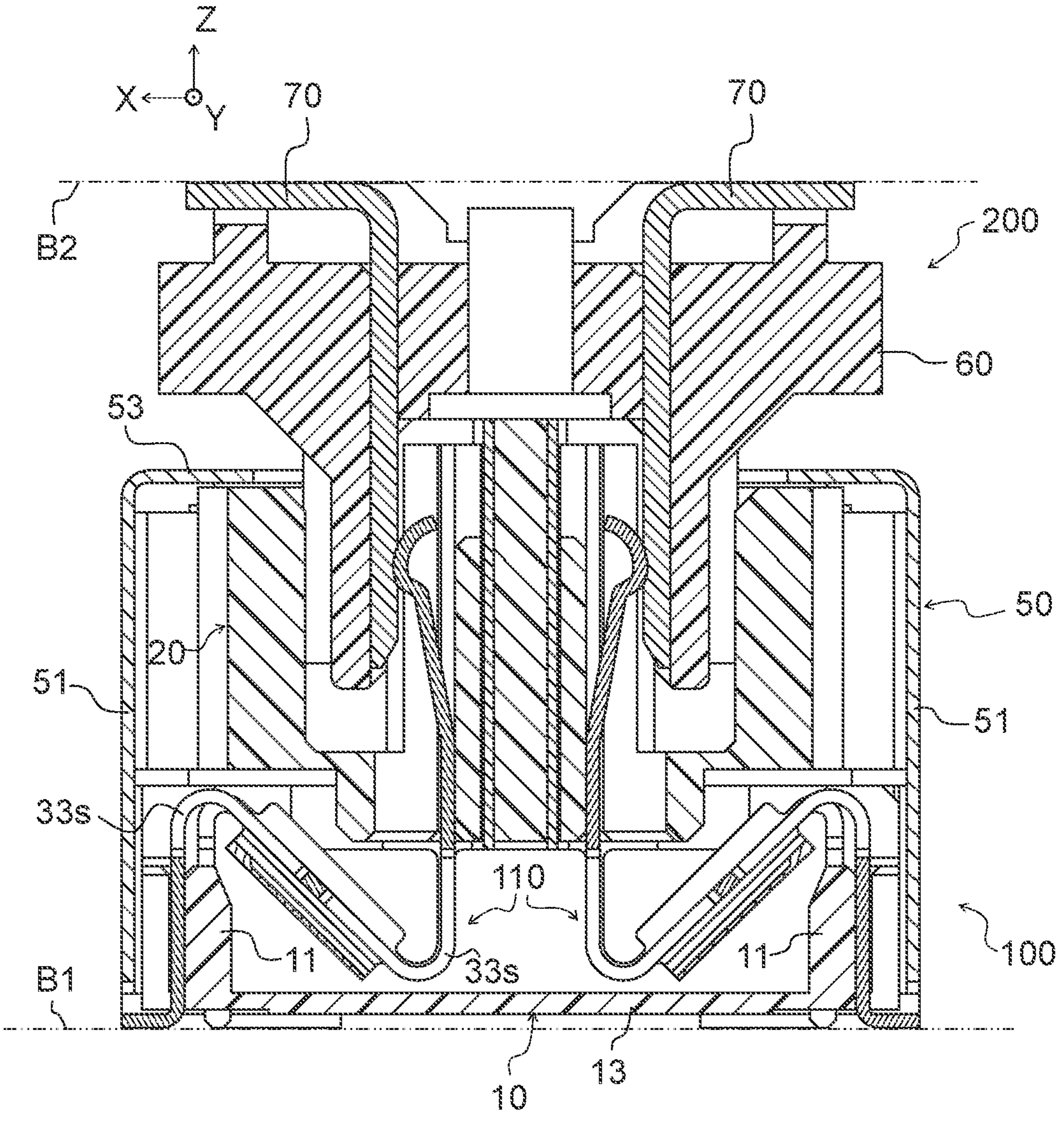
FIG. 3 is a cross-section illustrating a connector set in a connected state.

FIG. 1 to FIG. 3 illustrate the connector set 100, 200 configured from a first connector 100 and a second connector 200.

The first board B1 and the second board B2 can be connected together by mounting the first connector 100 to a first board B1, mounting the second connector 200 to a second board B2, and connecting the first connector 100 and the second connector 200 together. The first board B1 and the second board B2 are arranged parallel to each other. The first connector 100 is a floating connector, and the second connector 200 is not a floating connector.

First Connector 100

Figure 4:
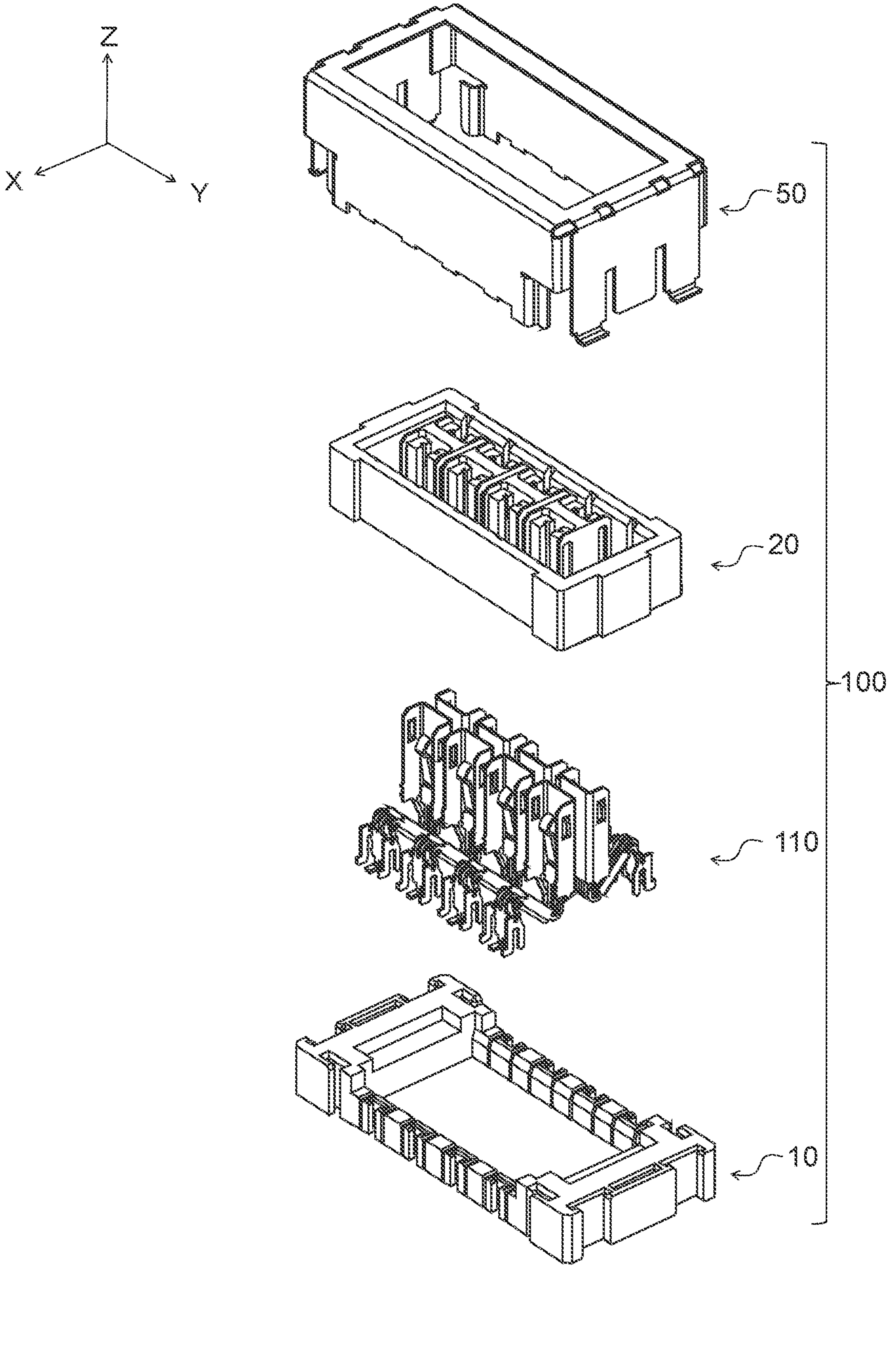
FIG. 4 is an exploded perspective view of a first connector.

As illustrated in FIG. 4, the first connector 100 incudes first housings 10, 20, plural first terminal sets 110, and a metal shell 50. The first housings 10, 20 include a fixed housing 10 and a movable housing 20. Each of the plural first terminal sets 110 includes a first signal terminal 30 and a first ground terminal 40.

The fixed housing 10 is a housing for fixing to the first board B1, which is the mounting target of the first connector 100. The fixed housing 10 is fixed to the first board B1 through the plural first terminal sets 110.

The movable housing 20 is a housing provided so as to be capable of moving with respect to the fixed housing 10. The movable housing 20 is supported in a floating state by the plural first terminal sets 110.

The fixed housing 10 and the movable housing 20 are formed from an insulator such as a synthetic resin.

First signal terminals 30 are for connecting to the first board B1 and to second signal terminals 70 of the second connector 200. The first signal terminals 30 are each manufactured by performing punching and bending processing and the like on a conductive plate material. The plural first signal terminals 30 are each formed in the same shape as each other.

The first ground terminals 40 for connecting to the first board B1 and to second ground terminals 80 of the second connector 200. The first ground terminals 40 are each manufactured by performing punching and bending processing and the like on a conductive plate material. The plural first ground terminals 40 are each formed in the same shape as each other.

The plural first terminal sets 110 are configured from plural (four in the drawings) of the first terminal sets 110 at a front side, and from plural (four in the drawings) of the first terminal sets 110 at the rear side. The front-side first terminal sets 110 and the rear-side first terminal sets 110 can be thought of as configuring pairs of first terminal sets 110, with these pairs of first terminal sets 110 being arrayed with the Y direction as the array direction. The first terminal sets 110 of each pair are disposed such that their contact portion side direction (a direction where a contact portion 36 is positioned with respect to a connection portion 31 when viewed along the Z direction) oppose each other so as to face toward the X direction inside (inter-row direction inside).

The metal shell 50 is a conductive member that covers substantially the entirety of the first housings 10, 20 and the plural first terminal sets 110. The metal shell 50 suppresses radiation noise.

First Signal Terminals 30

Next, detailed description follows regarding the first signal terminals 30.

Figure 6:
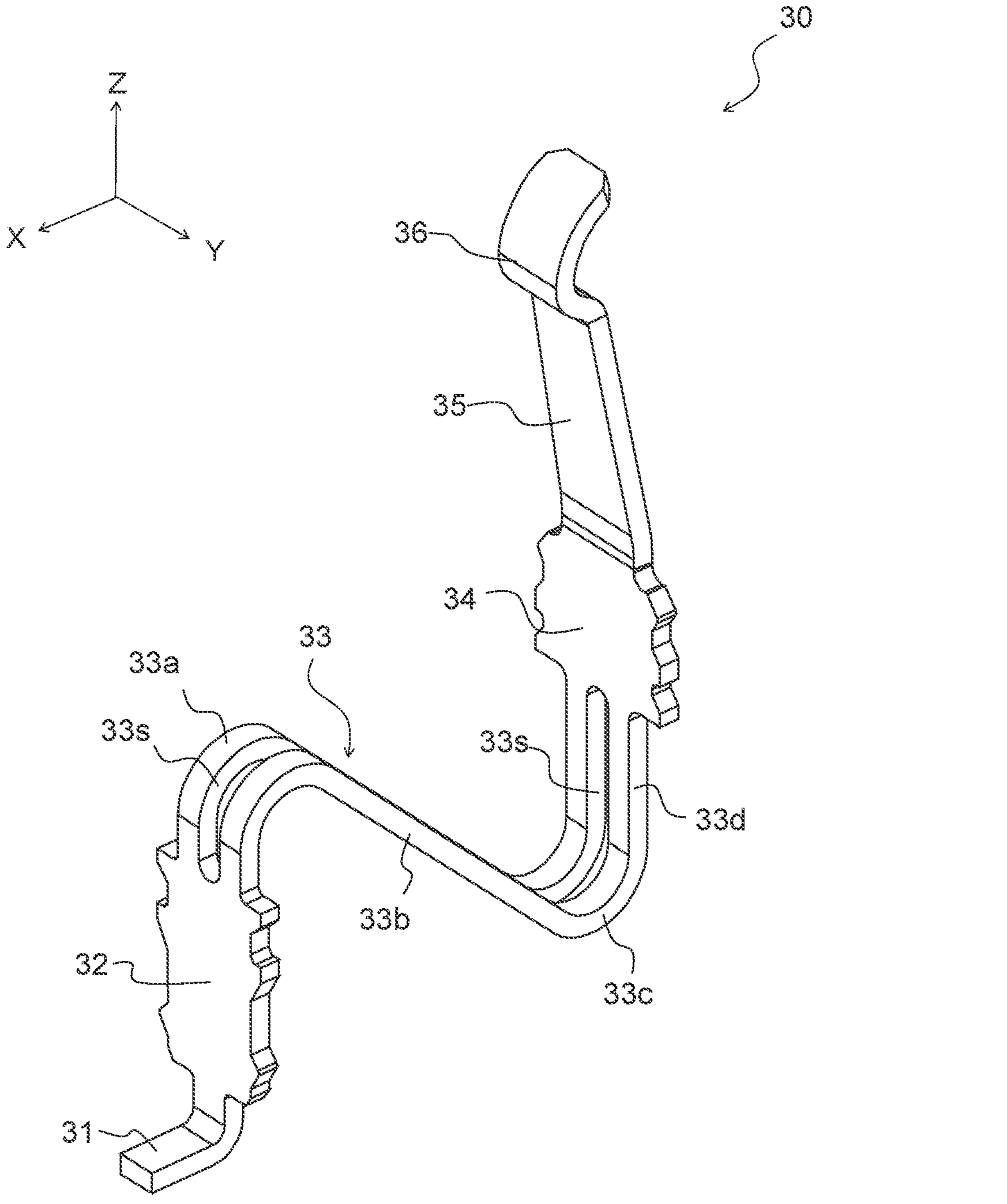
FIG. 6 is a perspective view of a first signal terminal.

As illustrated in FIG. 6, the first signal terminals 30 each include the connection portion 31, a fixed-side retained portion 32, an intermediate portion 33, a movable-side retained portion 34, and leading-end-side portions 35, 36, in this order.

The connection portion 31 is a portion for connecting to the first board B1. The connection portion 31 extends from the fixed-side retained portion 32 toward the outside in the X direction that is a direction along a face of the first board B1.

The fixed-side retained portion 32 is a portion retained in the fixed housing 10. The fixed-side retained portion 32 is retained in the fixed housing 10 by being press-fitted into the fixed housing 10 with a press-fit direction of a minus Z direction. The fixed-side retained portion 32 has a plate width direction facing in the Y direction that is the terminal array direction and extends in a plus Z direction. The fixed-side retained portion 32 includes press-fit protrusions. The press-fit protrusions are formed on both plate width direction sides of the fixed-side retained portion 32.

The intermediate portion 33 is a portion that couples the fixed-side retained portion 32 and the movable-side retained portion 34 together, and is a portion formed so as to be deformable such that the movable-side retained portion 34 is displaceable with respect to the fixed-side retained portion 32.

The intermediate portion 33 includes a one-end side bent portion 33*a*, a straight line portion 33*b*, an other-end side bent portion 33*c*, and a straight line portion 33*d*, in this order.

The one-end side bent portion 33*a* converts a Z direction component of the extension direction of the first signal terminals 30 from plus to minus.

The straight line portion 33*b* is a portion having an extension direction that is a straight line shape. The extension direction of the straight line portion 33*b* is a direction inclined toward the minus Z direction and X direction inside.

The other-end side bent portion 33*c* converts a Z direction component of the extension direction of the first signal terminals 30 from minus to plus.

The straight line portion 33*d* couples the other-end side bent portion 33*c* and the movable-side retained portion 34 together is a straight line shape. The extension direction of the straight line portion 33*d* is the plus Z direction.

A slit 33*s* is formed in the intermediate portion 33. The slit 33*s* is formed at a plate width direction center of the intermediate portion 33 and extends along the extension direction of the intermediate portion 33. The slit 33*s* is separated into a one-end side and an other-end side at an intermediate point of the extension direction of the intermediate portion 33 (an intermediate point of the extension direction of the straight line portion 33*b*) (see FIG. 3).

The movable-side retained portion 34 is a portion retained in the movable housing 20. The movable-side retained portion 34 is retained in the movable housing 20 by being press-fitted into movable housing 20 with a press-fit direction of the plus Z direction. The movable-side retained portion 34 has a plate width direction facing in the Y direction that is the terminal array direction and extends in the plus Z direction. The movable-side retained portion 34 includes press-fit protrusions. The press-fit protrusions are formed on both plate width direction sides of the movable-side retained portion 34. A plate width dimension of the movable-side retained portion 34 (i.e. a plate width dimension of a portion excluding the press-fit protrusions) is larger than that of the fixed-side retained portion 32.

The leading-end-side portions 35, 36 are portions further toward the other end side than the movable-side retained portion 34.

The leading-end-side portions 35, 36 include the contact portion 36 and a resilient support portion 35.

The contact portion 36 is a portion for contacting the second signal terminal 70 of the second connector 200. The contact portion 36 is bent in the plate thickness direction so as to be convex on the X direction outside, which is the direction of contact with the second signal terminal 70.

The resilient support portion 35 is a portion that resiliently supports the contact portion 36. When the second connector 200 is being connected to the first connector 100, the resilient support portion 35 resiliently deforms such that the contact portion 36 displaces toward the X direction inside. Note that each of the drawings illustrate profiles of a resiliently deformed state.

First Ground Terminals 40

Next detailed description follows regarding the first ground terminals 40.

Figure 7:
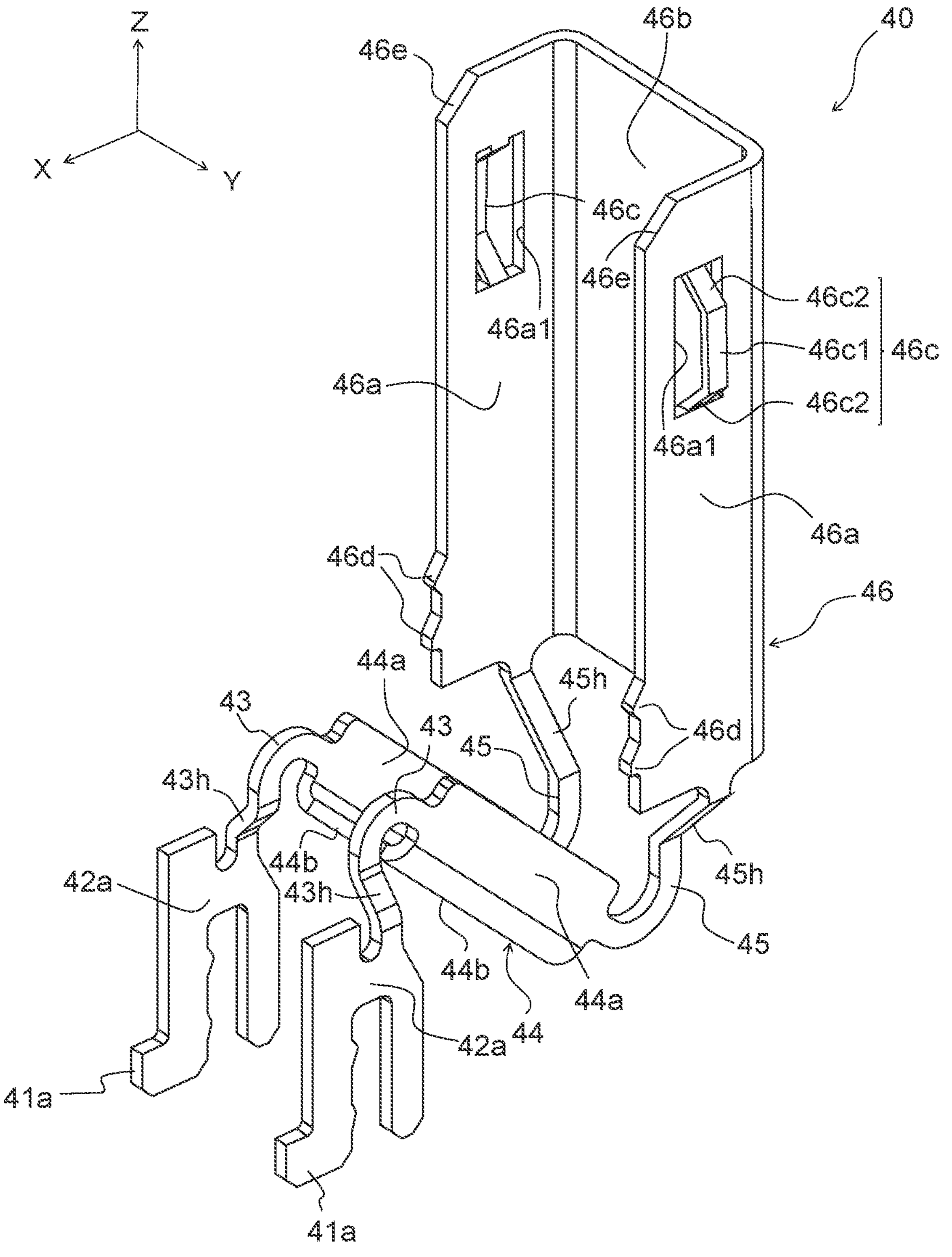
FIG. 7 is a perspective view of a first ground terminal.

As illustrated in FIG. 7, the first ground terminals 40 each include connection-side shielding portions 41*a*, 41*a*, fixed-side shielding portions 42*a*, 42*a*, an intermediate shielding portion 44, and a movable-side shielding portion 46.

The connection-side shielding portions 41*a*, 41*a* shield the connection portions 31 of the first signal terminals 30.

The connection-side shielding portions 41*a*, 41*a* include connection-side side portions 41*a* arranged as a pair at both width direction sides with respect to the connection portion 31 of each of the first signal terminals 30. The connection-side side portions 41*a* function as connection portions 41*a* for connecting to the first board B1.

The fixed-side shielding portions 42*a*, 42*a* shield the fixed-side retained portions 32 of the first signal terminals 30.

The fixed-side shielding portions 42*a*, 42*a* include fixed-side side portions 42*a* arranged as a pair at both width direction sides with respect to the fixed-side retained portion 32. The fixed-side side portions 42*a* function as fixed-side retained portions 42*a* retained in the fixed housing 10.

The intermediate shielding portion 44 shields the straight line portion 33*b* of the intermediate portion 33 of the first signal terminals 30.

The intermediate shielding portion 44 includes a pair of intermediate side portions 44*a*, 44*a*, and a pair of intermediate perpendicular direction portions 44*b*, 44*b*.

The pair of intermediate side portions 44*a*, 44*a* are arranged at both width direction sides with respect to the straight line portion 33*b* of the intermediate portion 33.

The intermediate perpendicular direction portions 44*b*, 44*b* are arranged in a direction perpendicular to the width direction (a direction along an ZX plane) with respect to the straight line portion 33*b* of the intermediate portion 33. The intermediate perpendicular direction portions 44*b*, 44*b* are arranged below the straight line portion 33*b*. The intermediate perpendicular direction portions 44*b*, 44*b* are configured from one intermediate perpendicular direction portion 44*b* connected to one intermediate side portion 44*a* through a bent portion, and the other intermediate perpendicular direction portion 44*b* connected to the other intermediate side portion 44*a* through a bent portion.

The movable-side shielding portion 46 shields the movable-side retained portion 34 and the leading-end-side portions 35, 36 of the first signal terminals 30. The movable-side shielding portion 46 is sometimes referred to below as a shielding portion 46, and the movable-side retained portion 34 and the leading-end-side portions 35, 36 are sometimes referred to as shielded portions 34, 35, 36.

The movable-side shielding portion 46 includes a pair of movable-side side portions 46*a* and a movable-side perpendicular direction portion 46*b*.

The pair of movable-side side portions 46*a* are arranged at both sides in the Y direction that is the terminal array direction with respect to the movable-side retained portion 34 and the leading-end-side portions 35, 36. The movable-side side portions 46*a* have flat plate shapes with plate thickness directions facing in the Y direction that is the terminal array direction. The movable-side side portions 46*a* are arranged at both array direction sides with respect to the shielded portions 34, 35, 36, and so are sometimes referred to as array direction shielding portions 46*a*.

The movable-side perpendicular direction portion 46*b* is arranged at the inside in the X direction that is the inter-row direction with respect to the movable-side retained portion 34 and the leading-end-side portions 35, 36. The movable-side perpendicular direction portion 46*b* has a flat plate shape with a plate thickness direction facing in the X direction that is the inter-row direction. The movable-side perpendicular direction portion 46*b* is arranged at the inter-row direction inside with respect to the shielded portions 34, 35, 36, and so is sometimes referred to below as an inter-row direction shielding portion 46*b*.

The movable-side shielding portion 46 has a U-shaped cross-section. Namely. X direction inside edges of the pair of movable-side side portions 46*a* are coupled together by the movable-side perpendicular direction portion 46*b*.

Press-fit protrusions 46*d* are formed to the movable-side side portions 46*a*. The press-fit protrusions 46*d* are positioned at a lower portion of the movable-side shielding portion 46.

Inclined portions 46*e* are formed to the movable-side side portions 46*a*. The inclined portions 46*e* are formed at an upper end and X direction outside of the movable-side side portions 46*a*. The inclined portions 46*e* are provided to guide the movable-side shielding portion 46 to an appropriate position of the movable housing 20 during an operation to press-fit the movable-side shielding portion 46 into the movable housing 20.

The movable-side shielding portion 46 includes electrical continuity contact portions 46*c*.

Figure 14:
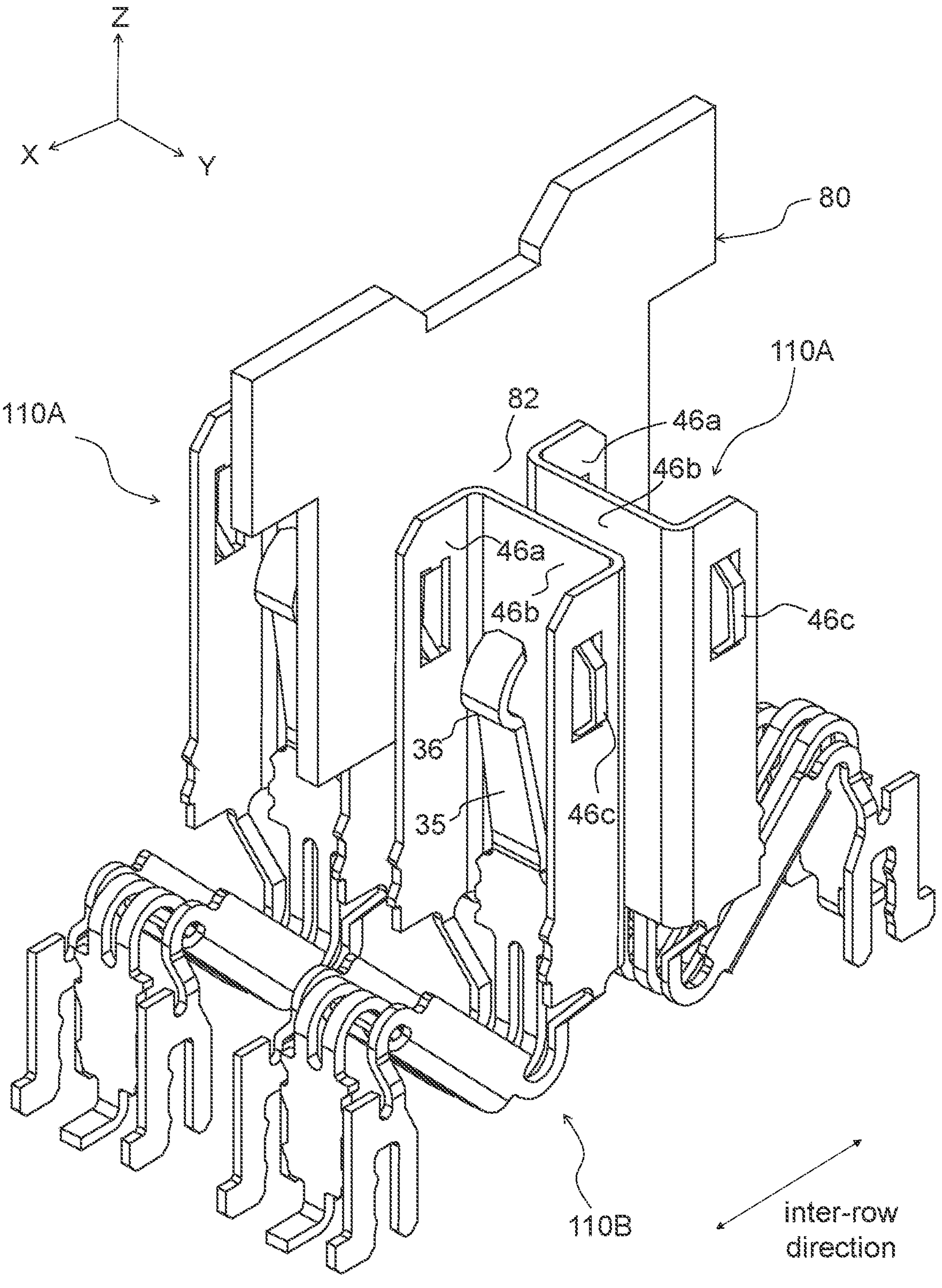
FIG. 14 is a perspective view illustrating a state in which a second ground terminal has been inserted into the plural first terminal sets of FIG. 13.
Figure 16:
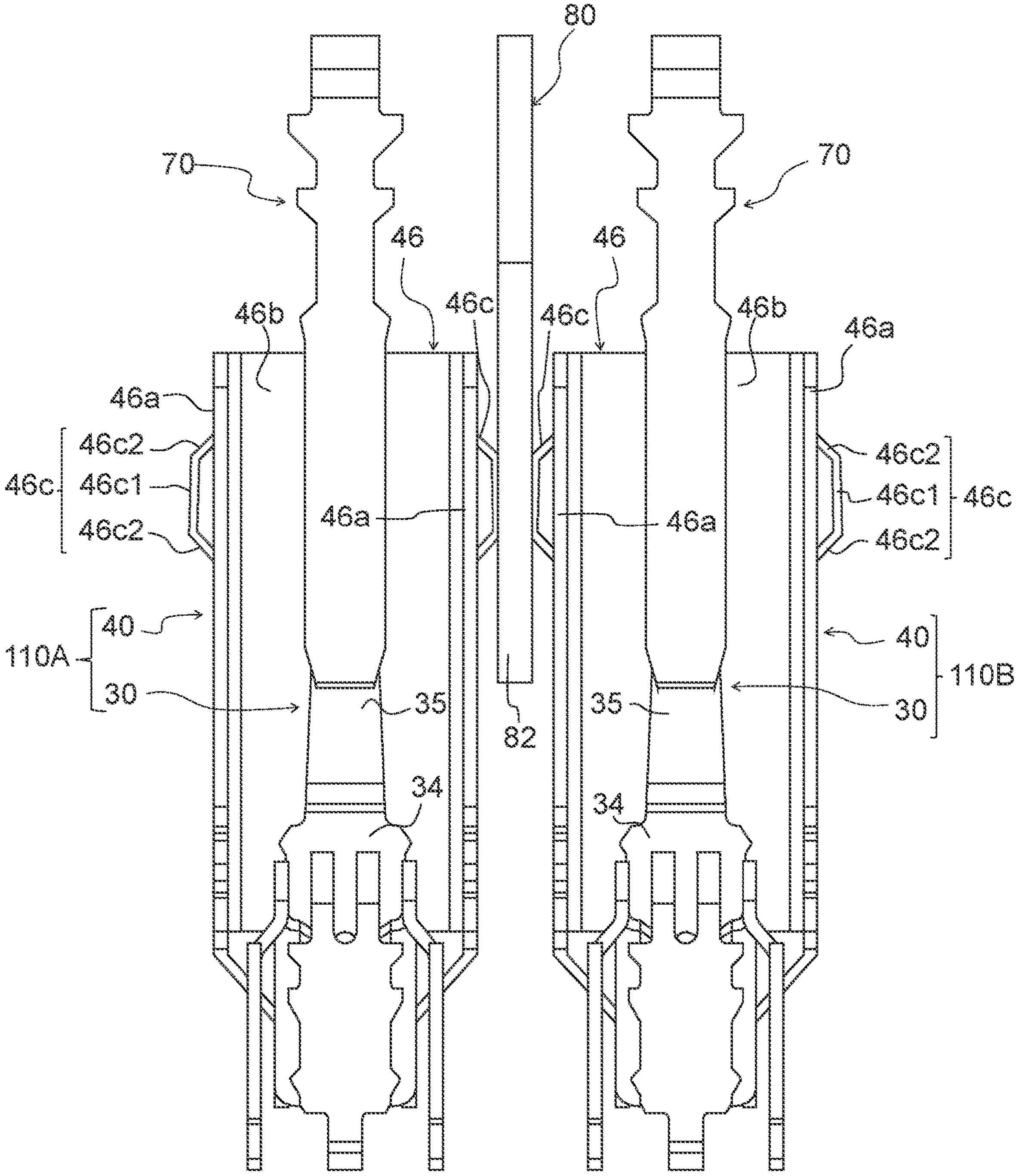
FIG. 16 is a perspective view illustrating a state in which a second ground terminal has been inserted between the two first terminal sets of FIG. 15.

The electrical continuity contact portions 46*c* are portions for contacting contact portions 82 (counterpart contacts) of the second ground terminals 80 of the second connector 200. As illustrated in FIG. 14 and FIG. 16, plural (four in the present exemplary embodiment) adjacent movable-side shielding portions 46 are electrically contiguous through the contact portion 82 of the second ground terminal 80 by placing the respective electrical continuity contact portions 46*c* in contact with the contact portion 82 of the second ground terminal 80. The contact portion 82 of the second ground terminal 80 is sometimes referred to as an electrical continuity interposer portion 82.

The electrical continuity contact portions 46*c* are positioned at an inside of an opening 46*al* formed in the movable-side side portions 46*a* as viewed in the Y direction that is the plate thickness direction of the movable-side side portions 46*a*. The electrical continuity contact portions 46*c* are positioned at an upper portion of the movable-side shielding portion 46 (more specifically at a Z direction position corresponding to the contact portion 36 of the first signal terminal 30).

The movable-side shielding portions 46 accordingly function as portions that make contact with the second ground terminals 80 of the second connector 200.

Figure 15:
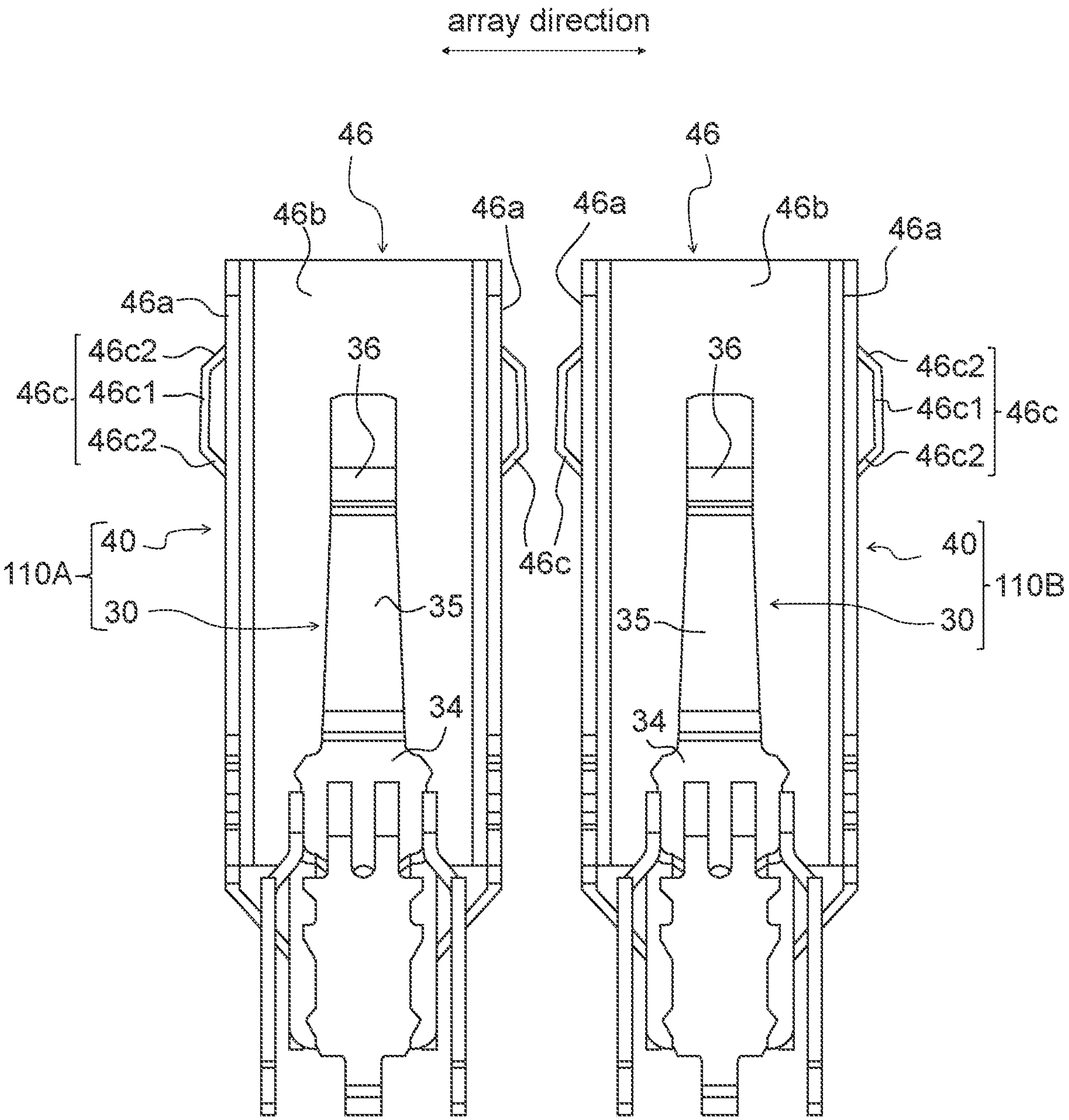
FIG. 15 is a diagram illustrating two first terminal sets adjacent in the array direction.

As illustrated in FIG. 15, the electrical continuity contact portions 46*c* include a contact point portion 46*cl* and two coupling portions 46*c*2.

The contact point portion 46*cl* is a portion that contacts the electrical continuity interposer portion 82 (counterpart contact).

The coupling portions 46*c*2 are portions that couple the contact point portion 46*cl* and the movable-side side portion 46*a* (portions of the movable-side shielding portion 46 other than the electrical continuity contact portion 46*c*) together.

The electrical continuity contact portions 46*c* are each formed in a shape that projects in the Y direction with respect to the movable-side side portions 46*a*.

One out of the two coupling portions 46*c*2 is positioned at an upper side of the contact point portion 46*c*1. The electrical continuity interposer portion 82 inserted from above accordingly reaches the contact point portion 46*cl* smoothly.

The other of the two coupling portions 46*c*2 is positioned at a lower side of the contact point portion 46*c*1. Providing the two coupling portions 46*c*2 at symmetrical positions with respect to the contact point portion 46*cl* enables more effective suppression of resonance, described later.

The method of forming such electrical continuity contact portions 46*c* is not particularly limited and is, for example, the following method.

(1) Cut and raise part of the movable-side side portion 46*a* (a portion that will become the electrical continuity contact portion 46*c*). When this approach is adopted the lower-side coupling portion 46*c*2 from out of the two coupling portions 46*c*2 is configured as a free end.

(2) Roll this cut and raised part so as extend it in the up-down direction.

(3) Press contact the free-end side of this cut and raised part against a terminal array direction outside face of the movable-side side portion 46*a*.

Note that at (2), the movable-side side portion 46*a* may also be rolled and extended.

Moreover, alternatively to the method described above, the electrical continuity contact portion 46*c* may be formed by a method of forming two side slits in the movable-side side portion 46*a*, and extending a portion between the two side slits.

The fixed-side shielding portions 42*a*, 42*a* and the intermediate shielding portion 44 are coupled together by the pair of fixed-side coupling portions 43. One of the fixed-side coupling portions 43 couples one of the fixed-side side portions 42*a* and one of the intermediate side portions 44*a* together, and the other of the fixed-side coupling portions 43 couples the other fixed-side side portion 42*a* and the other intermediate side portion 44*a* together. The fixed-side coupling portions 43 are configured so as to be readily resiliently deformed by being formed with a narrow width.

The movable-side shielding portion 46 and the intermediate shielding portion 44 coupled together by a pair of movable-side coupling portions 45. One of the movable-side coupling portion 45 couples one of the movable-side side portions 46*a* and one of the intermediate side portions 44*a* together, and the other of the movable-side coupling portions 45 couples the other movable-side side portion 46*a* and the other intermediate side portion 44*a* together. The movable-side coupling portions 45 are configured so as to be readily resiliently deformed by being formed with a narrow width.

A distance in the width direction between the pair of fixed-side side portions 42*a* is greater than the distance in the width direction between the pair of intermediate side portions 44*a*, 44*a*. The fixed-side coupling portions 43 each include a displacement portion 43*h* that displaces in a width direction. The displacement portion 43*h* of the fixed-side coupling portion 43 is formed at a position of the fixed-side coupling portion 43 adjoining the fixed-side side portions 42*a*.

The distance in the width direction between the pair of movable-side side portions 46*a* is greater than the distance in the width direction between the pair of intermediate side portions 44*a*, 44*a*. The movable-side coupling portions 45 accordingly each include a displacement portion 45*h* that displaces in a width direction. The displacement portion 45*h* of the movable-side coupling portion 45 is formed at a position of the movable-side coupling portion 45 adjoining the movable-side side portions 46*a*.

The distance in the width direction between the pair of movable-side side portions 46*a* is greater than the distance in the width direction between the pair of fixed-side side portions 42*a*.

Fixed Housing 10

Next detailed description follows regarding the fixed housing 10.

Figure 9:
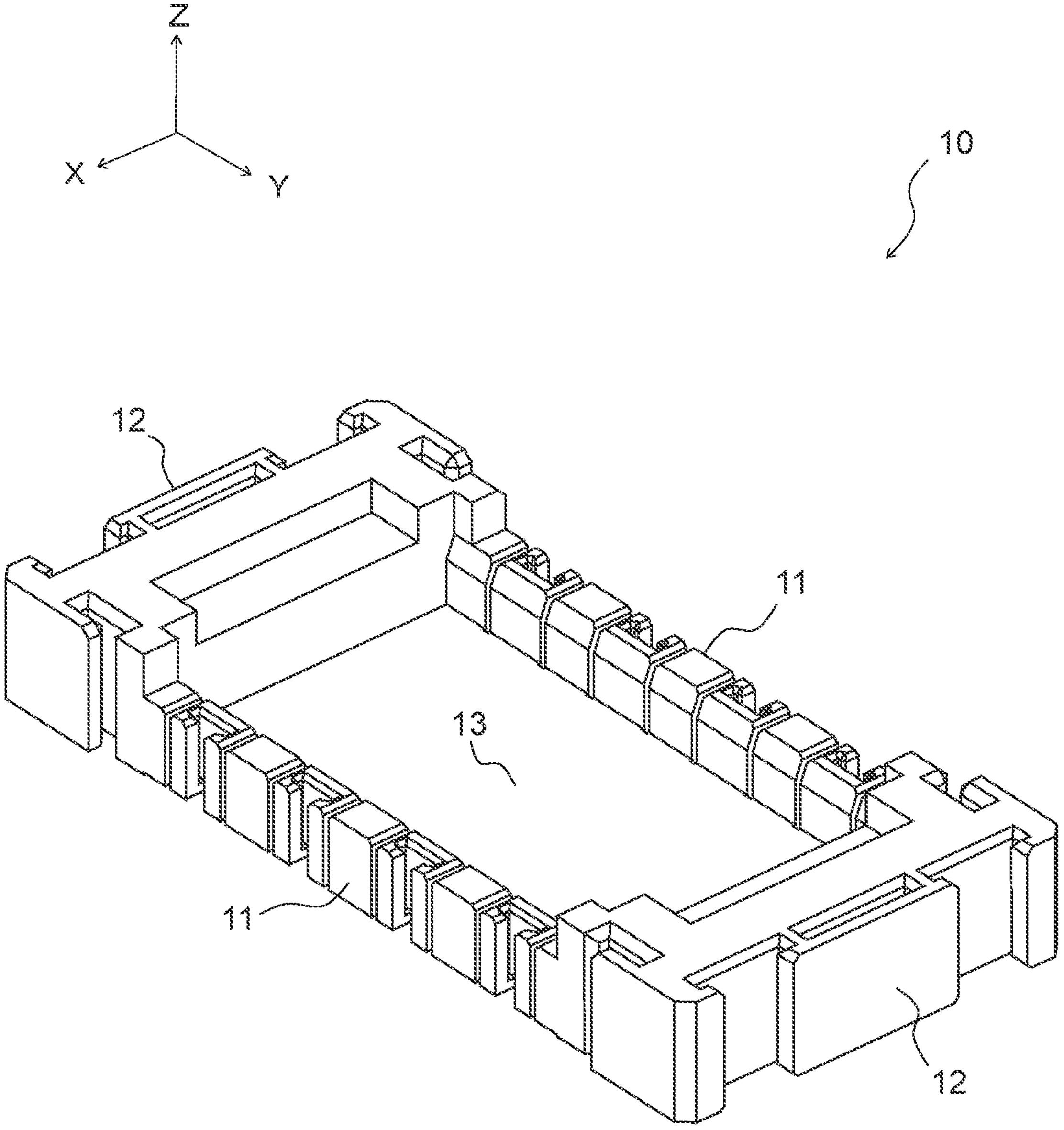
FIG. 9 is a perspective view of a fixed housing.

As illustrated in FIG. 9, the fixed housing 10 includes a front-side terminal retaining portion 11, and a rear-side terminal retaining portion 11. The front-side terminal retaining portion 11 and the rear-side terminal retaining portion 11 both have the same structure. These are both referred to below simply as terminal retaining portions 11 when not discriminating therebetween.

The terminal retaining portions 11 retain part of the plural first terminal sets 110. More specifically, the terminal retaining portions 11 are respectively configured such that the fixed-side retained portion 32 of the first signal terminal 30 and the fixed-side retained portion 42*a* of the first ground terminal 40 are able to be press-fitted therein.

The fixed housing 10 includes a pair of coupling portions 12. The coupling portions 12 couple both width direction sides of the front-side terminal retaining portion 11 and the rear-side terminal retaining portion 11 together in the front-rear direction. The coupling portions 12 are configured such that part of the metal shell 50 is able to be press-fitted therein. The pair of coupling portions 12 are configured by frame portions 11, 12 that are combined with the front-rear terminal retaining portions 11.

The fixed housing 10 includes a bottom wall portion 13. The bottom wall portion 13 configures a bottom face of a space surrounded by the frame portions 11, 12.

Movable Housing 20

Next detailed explanation follows regarding the movable housing 20.

Figure 10:
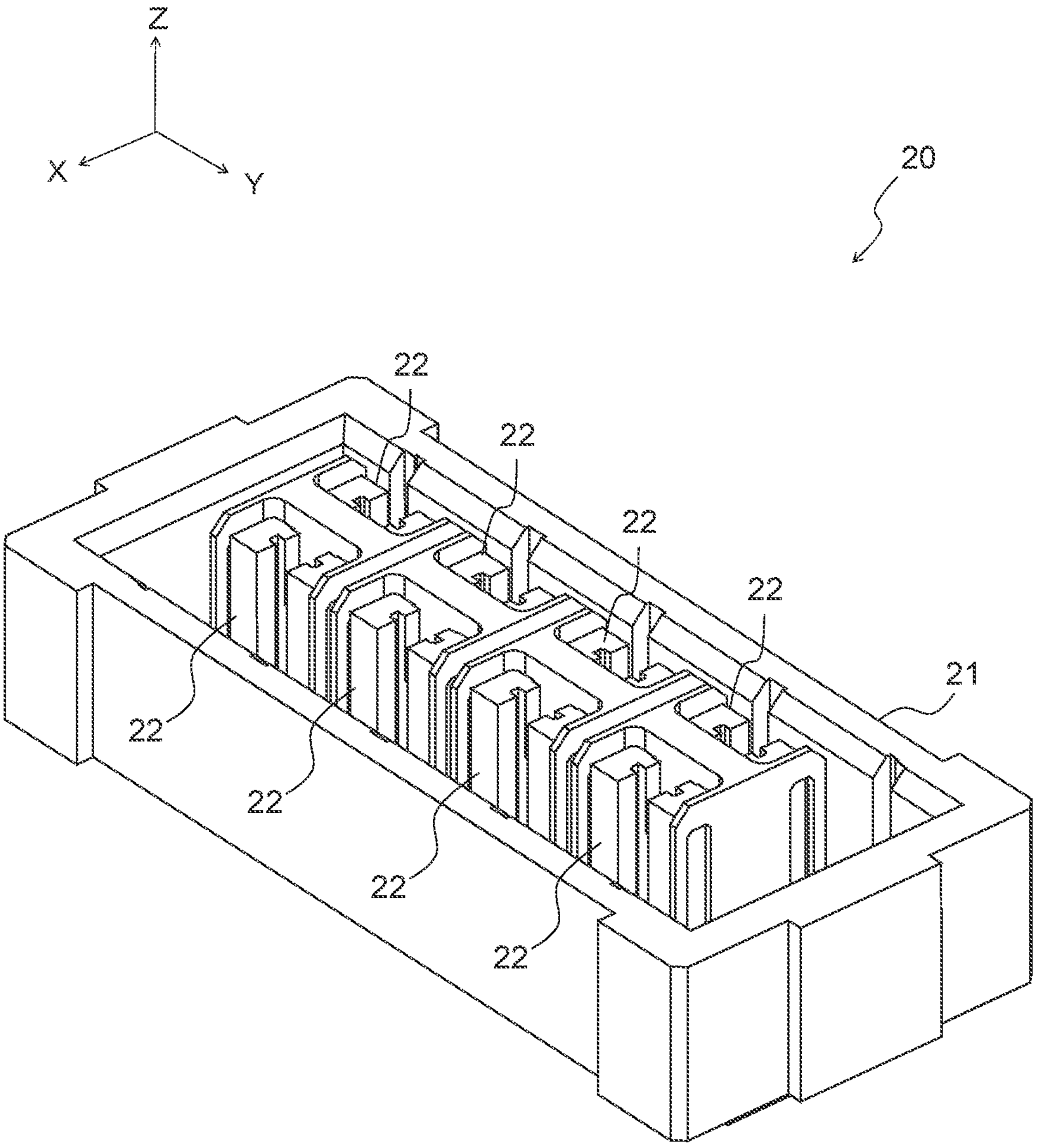
FIG. 10 is a perspective view of a movable housing.

As illustrated in FIG. 10, the movable housing 20 includes an outer peripheral wall 21. The outer peripheral wall 21 has a rectangular box shape.

The movable housing 20 includes plural terminal set corresponding portions 22.

Eight of the terminal set corresponding portions 22 are provided corresponding to the number of the first terminal sets 110. The leading-end-side portions 35, 36 of the first signal terminal 30 and the movable-side shielding portion 46 of the first ground terminal 40 are disposed in each of the terminal set corresponding portions 22. The terminal set corresponding portions 22 are formed higher than the outer peripheral wall 21.

Two of the terminal set corresponding portions 22 adjacent in the inter-row direction are formed as a single body. More specifically, later described X direction walls 22*b* and Y direction walls 22*a* (see FIG. 11) are formed as a single body of the X direction walls 22*b* and Y direction walls 22*a* of the terminal set corresponding portions 22 adjacent in the inter-row direction. This thereby results in a structure in which the terminal set corresponding portions 22 integrated together into pairs in the inter-row direction are arrayed as plural (four) pairs along the array direction.

Figure 11:
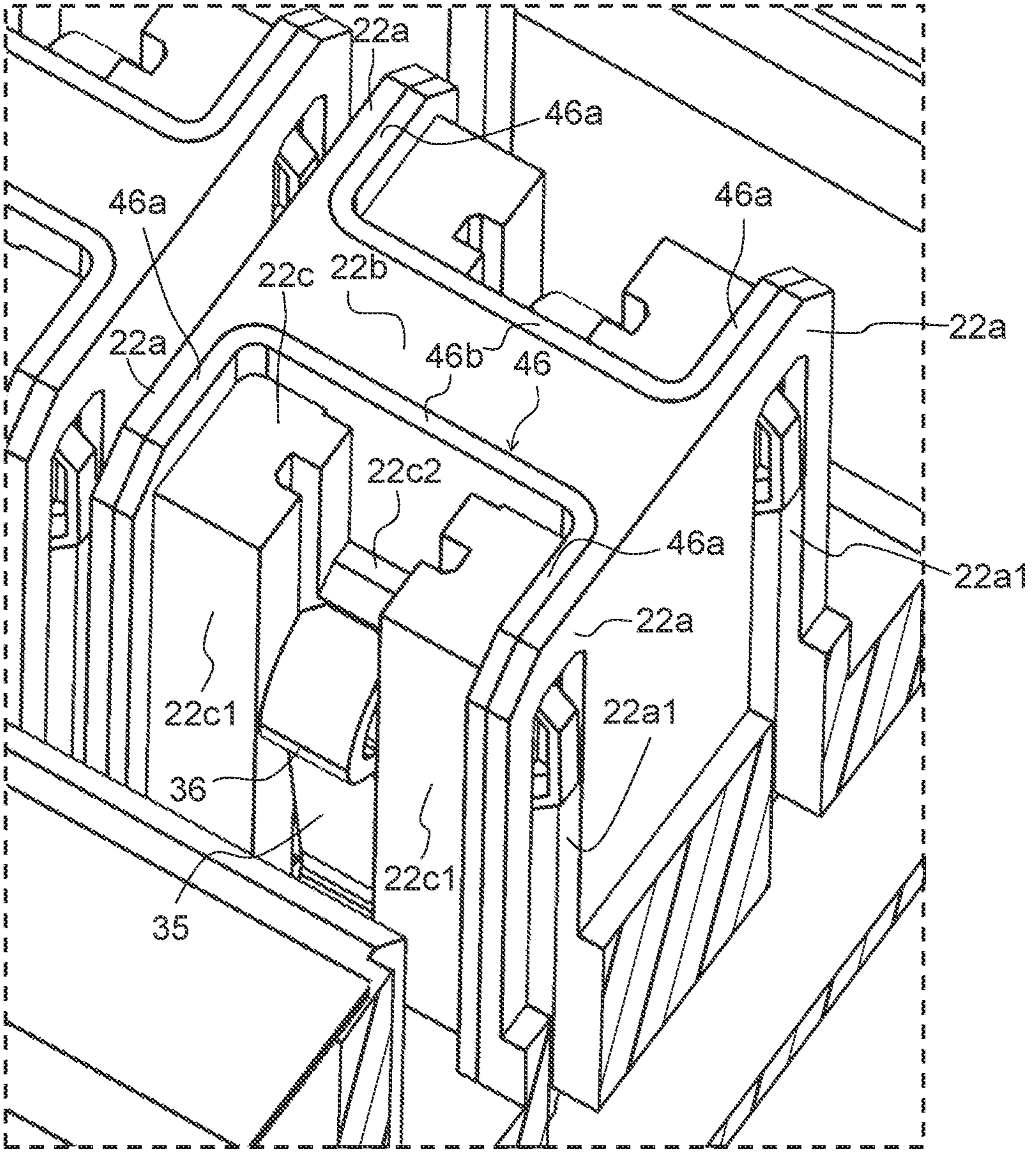
FIG. 11 is an enlarged diagram of part of a first connector.

As illustrated in FIG. 11, the terminal set corresponding portions 22 each include the Y direction walls 22*a* disposed at the array direction (Y direction) outside of the movable-side shielding portion 46.

The Y direction walls 22*a* are in a state of close proximity to or in contact with the movable-side side portions 46*a* of the movable-side shielding portion 46. Pass-through grooves 22*al* are formed in the Y direction walls 22*a* to let the electrical continuity contact portions 46*c* project out to the outside of the terminal set corresponding portions 22.

The terminal set corresponding portions 22 include the X direction walls 22*b* disposed at the inter-row direction (X direction) inside with respect to the movable-side shielding portion 46.

The X direction walls 22*b* are in a state of close proximity to or in contact with the movable-side perpendicular direction portion 46*b* of the movable-side shielding portion 46. The X direction walls 22*b* are configured by the X direction walls 22*b* of terminal set corresponding portions 22 adjacent in the inter-row direction being integrated together, and so the X direction walls 22*b* fill a space between inter-row direction adjacent of the movable-side shielding portions 46.

The terminal set corresponding portions 22 include shield inside walls 22*c* disposed between the first signal terminal 30 and the first ground terminal 40.

The shield inside walls 22*c* include Y direction portions 22*cl* disposed at Y direction sides with respect to the leading-end-side portions 35, 36 of the first signal terminal 30, and an X direction portion 22*c*2 disposed at an X direction inside with respect to the leading-end-side portions 35, 36 of the first signal terminal 30. The X direction portion 22*c*2 is formed lower than the Y direction portions 22*cl*.

The second ground terminals 80 are inserted between the array direction adjacent terminal set corresponding portions 22. The second ground terminals 80 are also inserted at the Y direction outside of the array direction outermost terminal set corresponding portions 22.

Metal Shell 50

Next detailed description follows regarding the metal shell 50.

Figure 12:
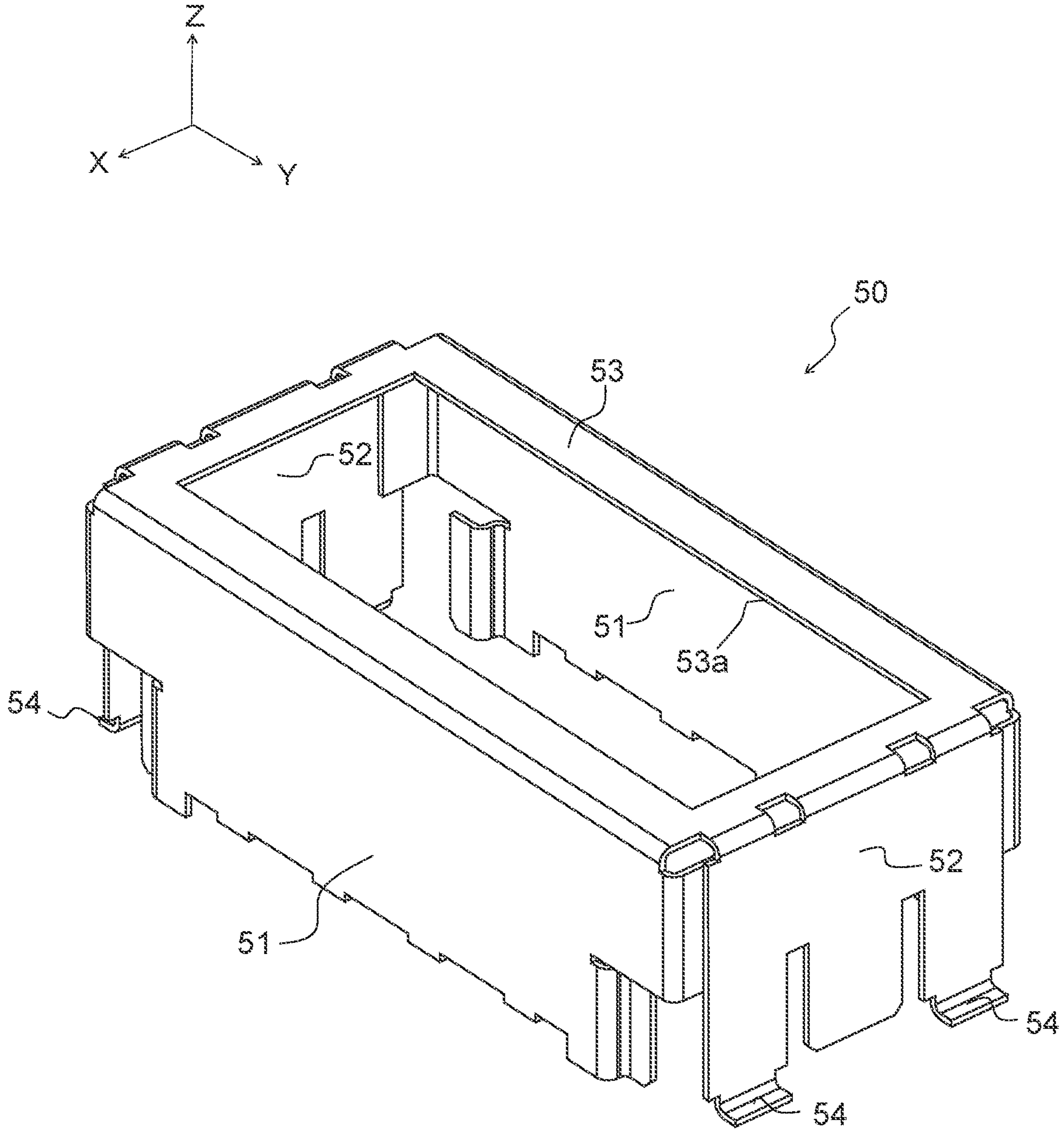
FIG. 12 is a perspective view of a metal shell.

As illustrated in FIG. 12, the metal shell 50 includes a pair of X direction shell portions 51, a pair of Y direction shell portions 52, and a Z direction shell portion 53.

The X direction shell portions 51 are arranged at the X direction outside with respect to the first housings 10, 20.

The Y direction shell portions 52 are arranged at the Y direction outside with respect to the first housings 10, 20. Press-fit protrusions (omitted in the drawings) are formed to the Y direction shell portions 52 for press-fitting into the fixed housing 10.

The Z direction shell portion 53 is disposed at the plus Z direction outside with respect to the first housings 10, 20. A connection opening 53*a* is formed in the Z direction shell portion 53. The Z direction shell portion 53 is formed in a frame shape as viewed in the Z direction.

The metal shell 50 includes connection portions 54 for connecting to the first board B1. The connection portions 54 extend from each of the pair of Y direction shell portions 52.

The metal shell 50 is retained in the fixed housing 10. A space that enables the movable housing 20 to move is formed inside the metal shell 50 (see FIG. 3).

Second Connector 200

Figure 17:
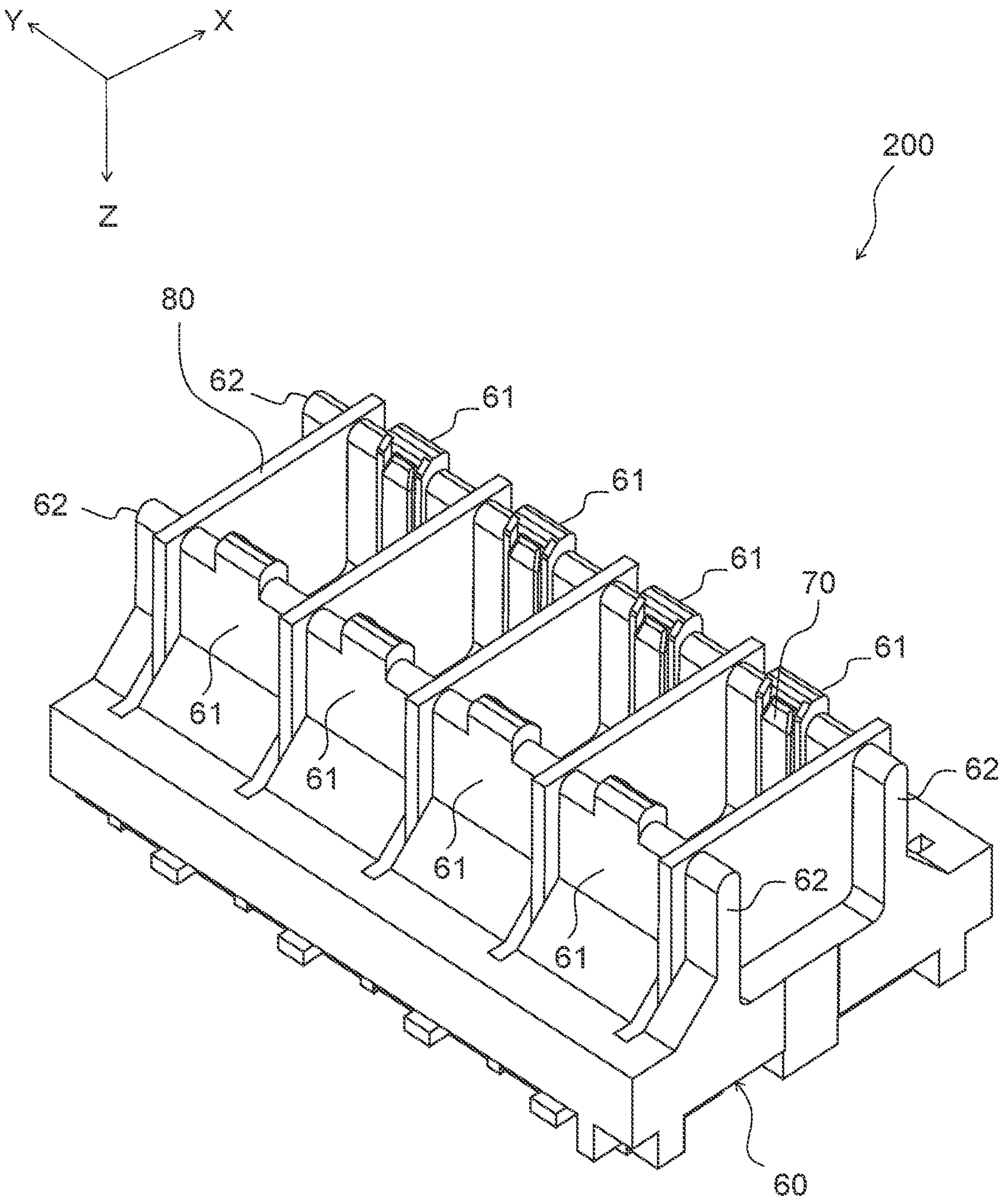
FIG. 17 is a perspective view of a second connector.
Figure 18:
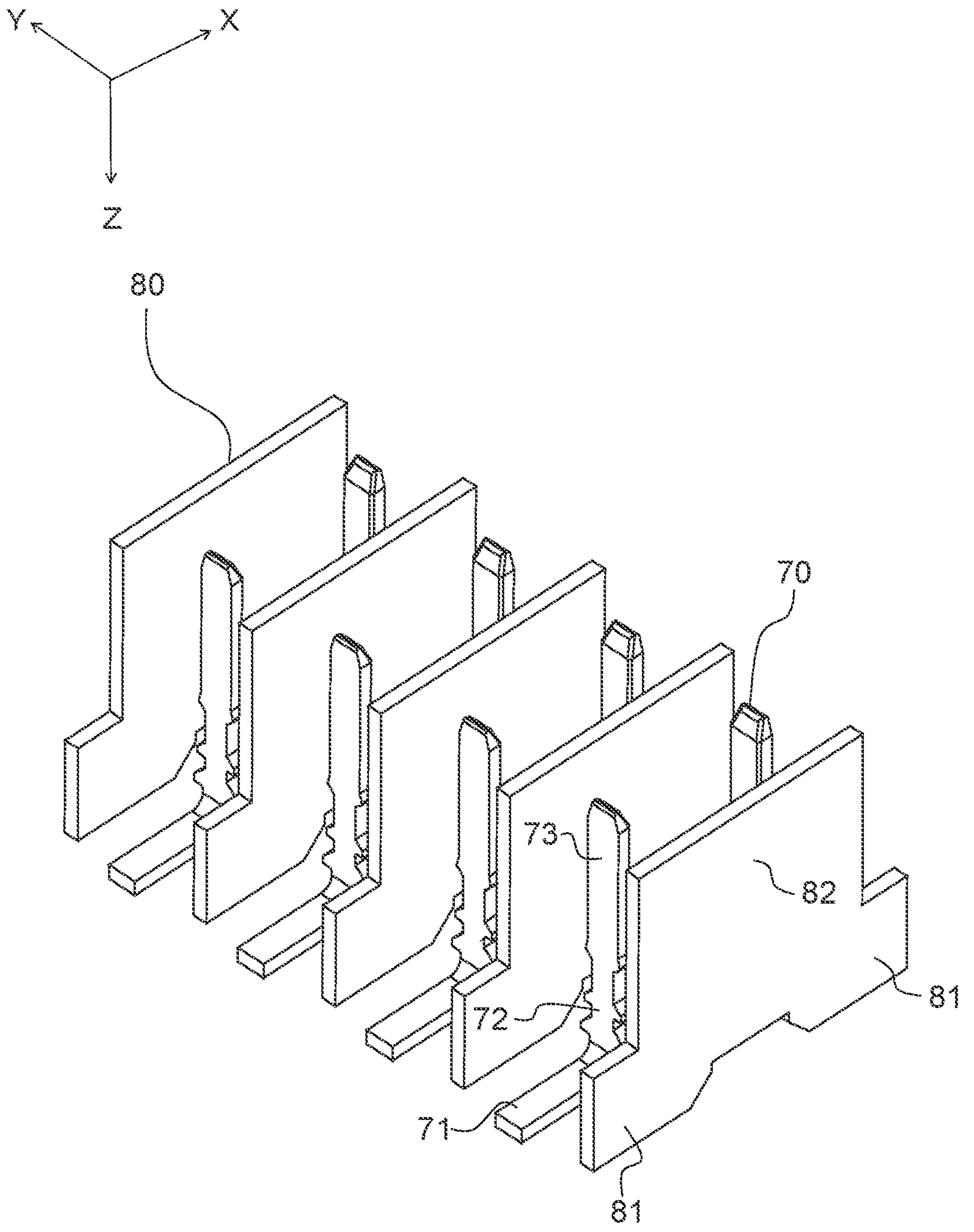
FIG. 18 is a perspective view of a second connector in which a second housing has been omitted from illustration.

As illustrated in FIG. 17 and FIG. 18, the second connector 200 includes a second housing 60, the plural second signal terminals 70, and the plural second ground terminals 80. The second housing 60 is only equipped with a fixed housing and is not equipped with a movable housing.

The second housing 60 is for fixing to the second board B2 that is the mounting target of the second connector 200. The second housing 60 is fixed to the second board B2 through the plural second signal terminals 70 and the plural second ground terminals 80. The second housing 60 is formed from an insulator such as a synthetic resin or the like.

The second signal terminals 70 are each connected to the second board B2 and to the first signal terminal 30 of the first connector 100. The second signal terminals 70 are each manufactured by performing punching and bending processing and the like on a conductive plate material. The plural second signal terminals 70 each have the same profile as each other.

The plural second signal terminals 70 include plural (four in the drawing) front-side second signal terminals 70, and plural (four in the drawing) rear-side second signal terminals 70. The front-side second signal terminals 70 and the rear-side second signal terminals 70 can be thought of as together configuring respective pairs of second signal terminals 70, with these pairs of the second signal terminals 70 arrayed with the Y direction as the terminal array direction. The second signal terminals 70 are disposed in pairs opposing each other such that contact portion-side directions of each other face toward the X direction inside.

The plural second ground terminals 80 include two outside second ground terminals 80 that are outermost in the array direction, and plural (three) inside second ground terminals 80 other than these. The outside second ground terminals 80 suppress noise from radiating outside the second connector 200. The inside second ground terminals 80 suppress crosstalk between the second signal terminals 70 adjacent in the terminal array direction (Y direction).

Second Signal Terminals 70

Next detailed description follows regarding the second signal terminals 70.

As illustrated in FIG. 18, the second signal terminals 70 each include a connection portion 71, a retained portion 72, and a contact portion 73, in this order.

The connection portion 71 is a portion for connecting to the second board B2. The connection portion 71 extends from the retained portion 72 toward the X direction outside that is a direction along a face of the second board B2, and is soldered to the face of the second board B2.

The retained portion 72 is a portion retained in the second housing 60. The retained portion 72 is retained in the second housing 60 by being press-fitted into the second housing 60 with a press-fit direction of the minus Z direction. The retained portion 72 includes press-fit protrusions. The press-fit protrusions are formed at both plate width direction sides of the retained portion 72.

The contact portions 73 are each a portion that contacts the respective first signal terminal 30. The contact portion 73 is connected to the retained portion 72 without there being a bent portion interposed therebetween, and extends in a straight line shape along the minus Z direction. The retained portion 72 and the contact portion 73 thereby extend is a straight line shape along the minus Z direction.

Second Ground Terminals 80

Next, detailed description follows regarding the second ground terminals 80.

The second ground terminals 80 each include connection portions 81 and a contact portion 82.

The connection portion 81 are portions for connecting to the second board B2. The connection portions 81 are formed at two locations on one side and another side in the X direction that is the inter-row direction. The connection portions 81 each have a flat plate shape with a plate thickness direction facing in the Y direction that is the terminal array direction.

The contact portions 82 are portions for making contact with the first ground terminals 40. The contact portions 82 each have a flat plate shape with a plate thickness direction facing in the Y direction that is the terminal array direction. One face (array direction inside face) of the contact portions 82 outermost in the array direction make contact with both of two first ground terminals 40 that are adjacent in the inter-row direction. One face of the contact portions 82 of the inside second ground terminals 80 makes contact with both of two inter-row direction adjacent first ground terminals 40, and another face thereof also makes contact with both of another two inter-row direction adjacent first ground terminals 40. The contact portions 82 are each formed in the same flat plane as the connection portions 81 (in a flat plane orthogonal to the Y direction). The first ground terminals 40 can be manufactured without using bending processing.

Note that the contact portions 82 can be thought of as being a portion formed by integrating a portion for making contact with the first ground terminal 40 on one side in the inter-row direction together with a portion for making contact with the first ground terminal 40 on the other side in the inter-row direction.

Second shield terminals of the present disclosure are not limited thereto, and each of the second ground terminals 80 of the present exemplary embodiment may be separated in the inter-row direction and formed into two second shield terminals.

Second Housing 60

Next detailed description follows regarding the second housing 60.

As illustrated in FIG. 17, the second housing 60 includes plural (eight) terminal placement walls 61.

The terminal placement walls 61 support the contact portion 73 of the second signal terminals 70 from the inter-row direction outside and both sides in the array direction. Plural of the terminal placement walls 61 are formed corresponding to the number of the second signal terminals 70.

Two terminal placement walls 61 adjacent in the array direction support one of the second ground terminals 80 disposed therebetween from both Y direction sides.

The second housing 60 includes plural (four) support portions 62.

The support portions 62 cooperate with the terminal placement walls 61 to support the outside second ground terminals 80 from both Y direction sides.

Operation and Advantageous Effects

Next, description follows regarding the operation and advantageous effects of the present exemplary embodiment.

As illustrated in FIG. 1 to FIG. 3, the connector set 100, 200 according to the present exemplary embodiment includes the first connector 100 and the second connector 200 that are connectable together.

Figure 5:
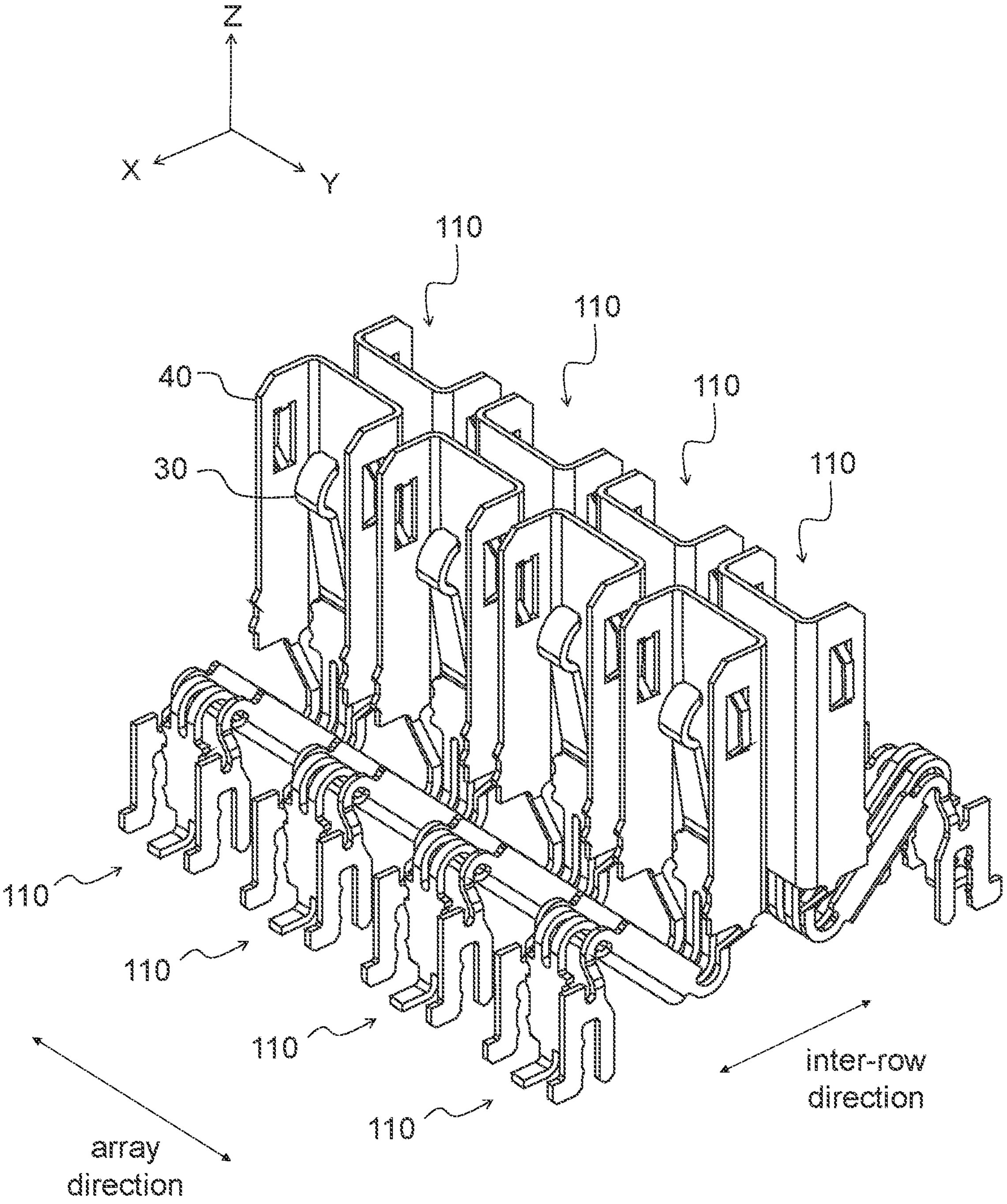
FIG. 5 is a perspective view of plural first terminal sets.
Figure 8:
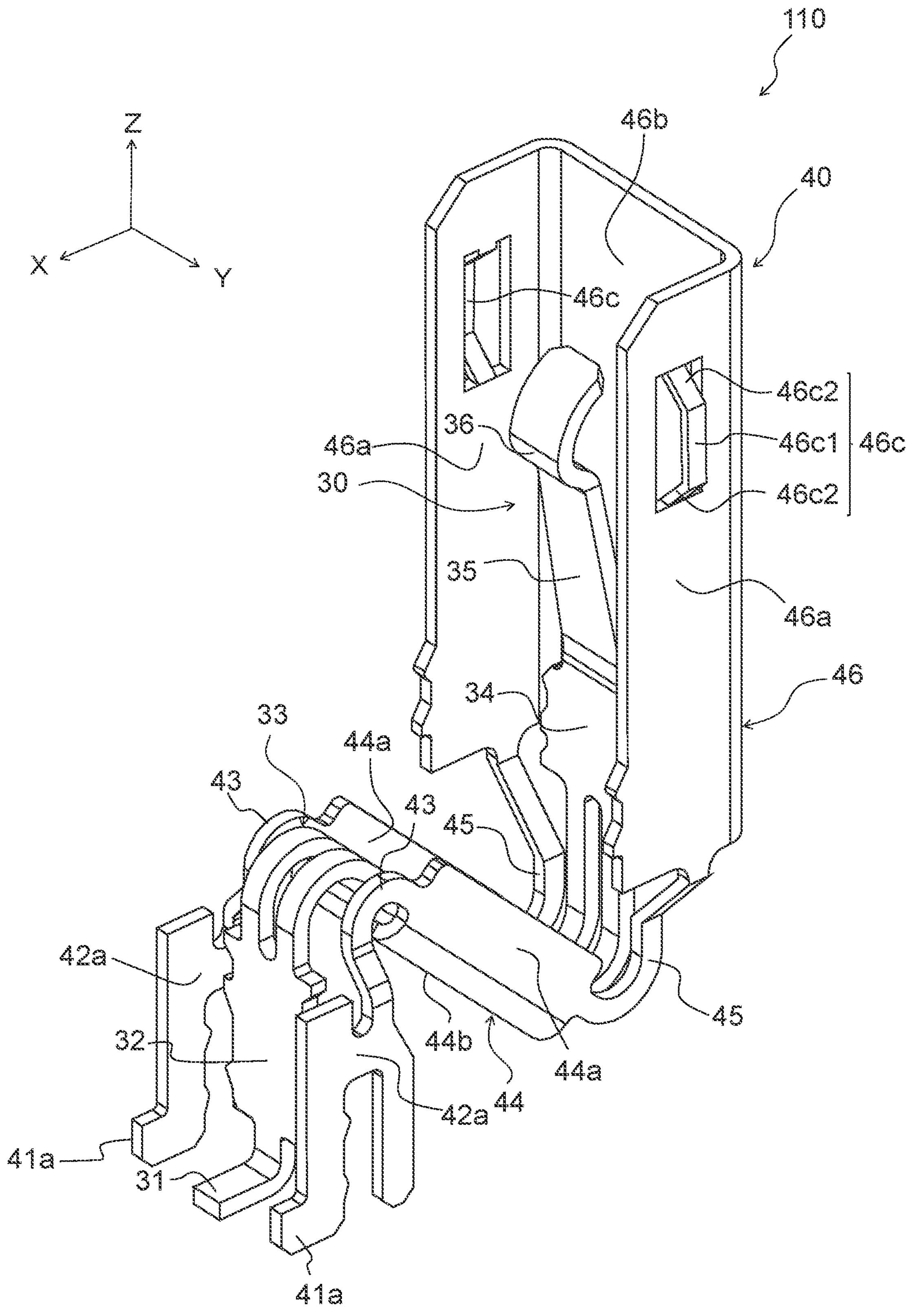
FIG. 8 is a perspective view of a first terminal set.

As illustrated in FIG. 4 and FIG. 5, the first connector 100 includes the plural first terminal sets 110. As illustrated in FIG. 8, each of the plural first terminal sets 110 includes the first signal terminal 30 and the first ground terminal 40. The first signal terminal 30 includes the shielded portions 34, 35, 36, and the first ground terminal 40 includes the shielding portion 46.

Focusing on two mutually adjacent first terminal sets 110A, 110B from out of the plural first terminal sets 110, as illustrated in FIG. 13 to FIG. 16, part of the shielding portion 46 of the one first terminal set 110A (the movable-side side portions 46*a* or the movable-side perpendicular direction portion 46*b* in the present exemplary embodiment) and part of the shielding portion 46 of the other first terminal set 110B (the movable-side side portions 46*a* or the movable-side perpendicular direction portion 46*b* in the present exemplary embodiment) are disposed in a state opposing each other between the shielded portions 34, 35, 36 of the one first terminal set 110A and the shielded portions 34, 35, 36 of the other first terminal set 110B.

Crosstalk between the first signal terminals 30 is accordingly suppressed.

Moreover, as illustrated in FIG. 14 and FIG. 16, the shielding portion 46 of the one first terminal set 110A and the shielding portion 46 of the other first terminal set 110B are configured such that there is electrical continuity therebetween through the electrical continuity interposer portion 82 provided to the second connector 200.

Namely, the two adjacent shielding portions 46 are electrically contiguous in the connector set 100, 200 in a state in which at least the first connector 100 is connected to the second connector 200 (hereafter referred to as a connector connected state).

This thereby enables resonance between the two adjacent shielding portions 46 to be suppressed compared to embodiments in which the two adjacent shielding portions 46 are in a state not electrically contiguous in the connector set 100, 200 in a connector connected state.

Note that instead of the configuration of the present exemplary embodiment, a configuration may be adopted in which the two adjacent shielding portions 46 are electrically contiguous by being in direct contact. Even in such cases, resonance between the two adjacent shielding portions 46 can be suppressed compared to embodiments in which the two adjacent shielding portions 46 are not electrically contiguous in the connector set 100, 200 in a connector connected state.

However, in the present exemplary embodiment a configuration is adopted in which both of the two adjacent shielding portions 46 are electrically contiguous by inserting the electrical continuity interposer portion 82 between the two adjacent shielding portions 46. This accordingly facilitates achieving a stable electrically contiguous state of the two adjacent shielding portions 46 compared to embodiments configured such that the two adjacent shielding portions 46 are electrically contiguous by being in direct contact.

Moreover, in the present exemplary embodiment the shielding portion 46 includes the electrical continuity contact portions 46*c* that contact the electrical continuity interposer portion 82 serving as the counterpart contacts. As illustrated in FIG. 15 and FIG. 16, the electrical continuity contact portions 46*c* are shaped to project toward the counterpart contacts.

This thereby enables contact between the electrical continuity contact portions 46*c* and the counterpart contacts to be secured.

Note that in cases in which a configuration is adopted in which the two adjacent shielding portions 46 are electrically contiguous by being in direct contact, the electrical continuity contact portions 46*c* contact the electrical continuity contact portions 46*c* provided to the shielding portions 46 of adjacent first terminal sets 110.

Moreover, in the present exemplary embodiment as illustrated in FIG. 16, the electrical continuity interposer portions 82 each have a flat plate shape, and flat faces on both sides thereof contact the electrical continuity contact portions 46*c*.

Forming of the electrical continuity interposer portions 82 is facilitated thereby.

Moreover, the electrical continuity contact portions 46*c* in the present exemplary embodiment include the contact point portion 46*cl* for contacting the counterpart contact, and the plural coupling portions 46*c*2. Each of the plural coupling portions 46*c*2 couple the contact point portion 46*cl* and portions of the shielding portion 46 other than the electrical continuity contact portions 46*c* (the movable-side side portions 46*a* in the present exemplary embodiment) together.

This thereby enables resonance between the two adjacent shielding portions 46 to be suppressed more effectively in comparison to embodiments that include merely a single coupling portion 46*c*2.

Moreover, in the present exemplary embodiment as illustrated in FIG. 5, the plural first terminal sets 110 are configured by the first terminal sets 110 disposed in pairs opposing each other in the inter-row direction, with plural of the pairs arrayed along the array direction.

Figure 13:
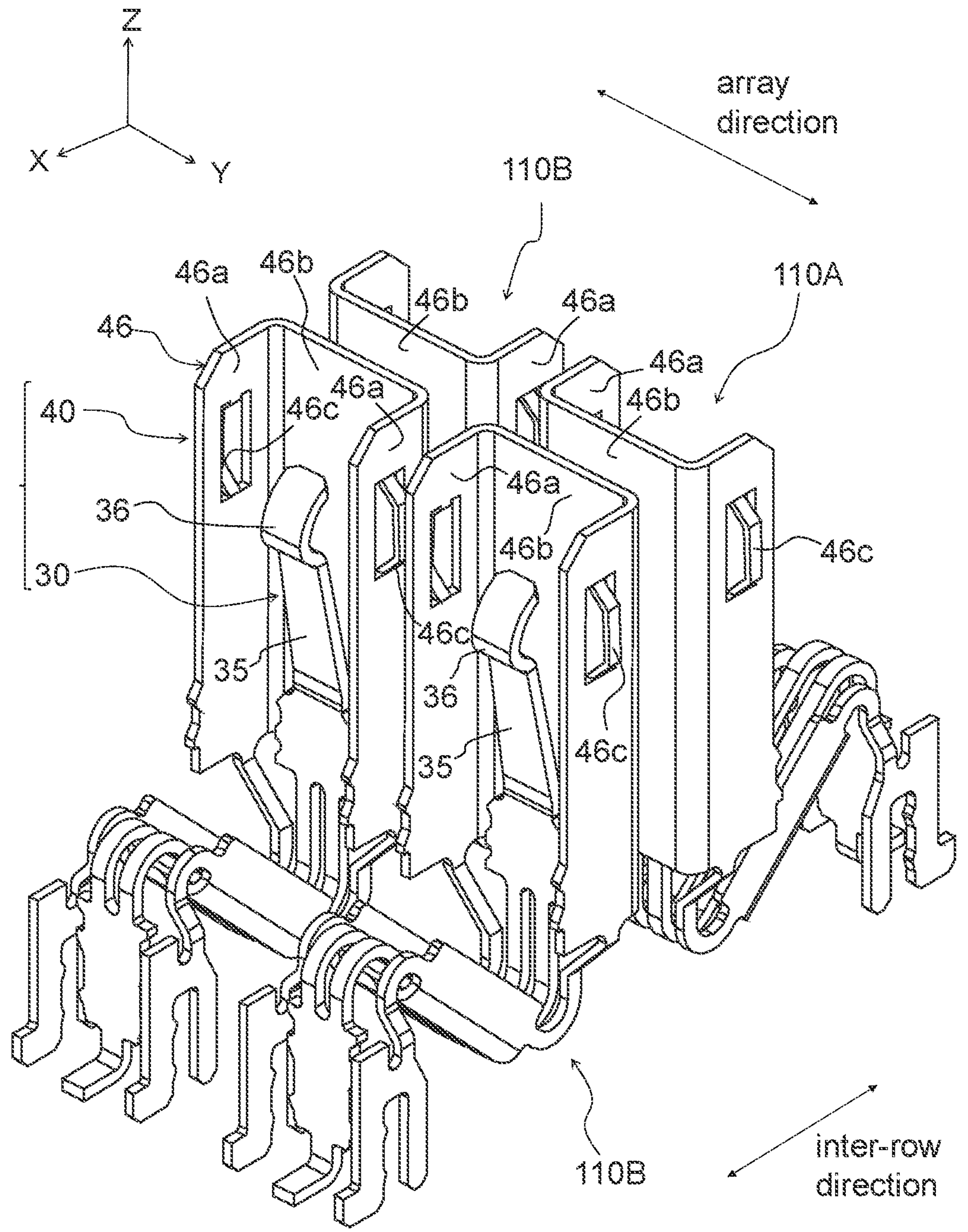
FIG. 13 is a perspective view illustrating plural first terminal sets adjacent in a terminal array direction and an inter-row direction.

Moreover, as illustrated in FIG. 8 and FIG. 13, the shielding portions 46 each include the inter-row direction shielding portion 46*b* disposed at the inter-row direction inside with respect to the shielded portions 34, 35, 36, and the pair of array direction shielding portions 46*a* disposed at both sides in the array direction with respect to the shielded portions 34, 35, 36. The two inter-row direction shielding portions 46*b* are thereby disposed between two inter-row direction adjacent shielded portions 34, 35, 36, and two array direction shielding portions 46*a* are disposed between two array direction adjacent shielded portions 34, 35, 36.

This thereby enables crosstalk to be suppressed effectively in cases in which the plural first terminal sets 110 are configured by the first terminal sets 110 disposed in pairs opposing each other in the inter-row direction, with plural such pairs arrayed along the array direction.

Moreover, in the present exemplary embodiment as illustrated in FIG. 14, focusing on two mutually adjacent first terminal sets 110A, 110B, the electrical continuity interposer portion 82 is inserted between the array direction shielding portions 46*a* of the one first terminal set 110A and the array direction shielding portions 46*a* of the other first terminal set 110B, such that the array direction shielding portions 46*a* are electrically contiguous through the electrical continuity interposer portion 82.

This thereby enables resonance occurring in the array direction shielding portions 46*a* to be particularly suppressed from out of the inter-row direction shielding portions 46*b* and the array direction shielding portions 46*a* provided to the shielding portion 46. As a result thereof, the first terminal sets 110 can be arrayed at a narrow interval in the array direction, and first connector 100 can accordingly be made more compact in the array direction.

Note that instead of this configuration of the present exemplary embodiment, a configuration may be adopted in which an electrical continuity interposer portion is inserted between the inter-row direction shielding portion 46*b* of the one first terminal set 110A and the inter-row direction shielding portion 46*b* of the other first terminal set 110B, such that the inter-row direction shielding portions 46*b* are electrically contiguous through the electrical continuity interposer portion. Moreover, in such cases the electrical continuity interposer portion may have a flat plate shape with a plate thickness direction facing in the inter-row direction.

Moreover, instead of such a configuration of the present exemplary embodiment, a configuration may be adopted in which two mutually adjacent shielding portions 46 are in direct contact without an electrical continuity interposer portion therebetween, such that the array direction shielding portions 46*a* are electrically contiguous or the inter-row direction shielding portions 46*b* are electrically contiguous.

In the present exemplary embodiment the shielded portions 34, 35, 36 include the contact portion 36 for contacting the respective second signal terminal 70.

This thereby enables crosstalk between the second signal terminals 70 to be suppressed effectively.

Moreover, in the present exemplary embodiment the first connector 100 is employed mounted to the first mounting target B1, and the shielding portions 46 are able to move with respect to the first mounting target B1.

This thereby enables a floating connector to be applied to the first connector 100.

Although detailed description has been given above of configurations of exemplary embodiments of the present disclosure, the present disclosure is not limited thereto.

For example, in the above exemplary embodiment an example has been described in which the contact portions 36 of the first signal terminals 30 are able to resiliently displace, and the contact portions 73 of the second signal terminals 70 are not able to resiliently displace. However, the present disclosure is not limited thereto, a configuration may be adopted in which contact portions of the first signal terminals are not able to resiliently displace but contact portions of the second signal terminals are able to resiliently displace.

EXPLANATION OF REFERENCE NUMERALS

100, 200 connector set
100 first connector
110 first terminal set
110A, 110B two adjacent first terminal sets
110A one first terminal set
110B other first terminal set
10, 20 first housing
10 fixed housing
20 movable housing
30 first signal terminal
34 movable-side retained portion (shielded portion)
35, 36 leading-end-side portion (shielded portion)
35 resilient support portion (shielded portion)
36 contact portion (shielded portion)
40 first ground terminal
46 movable-side shielding portion (shielding portion)
46*a* movable-side side portion (array direction shielding portion)
46*b* movable-side perpendicular direction portion (inter-row direction shielding portion)
46*c* electrical continuity contact portion
46*c*1 contact point portion
46*c*2 coupling portion
200 second connector
60 second housing
70 second signal terminal
80 second ground terminal

82 contact portion (electrical continuity interposer portion)

B1 first board (first mounting target)

B2 second board (second mounting target)

The invention claimed is:

1. A first connector configured to be connected to a second connector, wherein:

the first connector includes a plurality of first terminal sets;

each of the plurality of first terminal sets includes a first signal terminal and a first ground terminal;

the first signal terminal includes a shielded portion;

the first ground terminal includes a shielding portion;

two adjacent first terminal sets from among the plurality of first terminal sets have the following features;

part of the shielding portion of one of the two adjacent first terminal sets and part of the shielding portion of another of the two adjacent first terminal sets are disposed in a state opposing each other between the shielded portion of the one of the two adjacent first terminal sets and the shielded portion of the other of the two adjacent first terminal sets; and the shielding portion of the one of the two adjacent first terminal sets and the shielding portion of the other of the two adjacent first terminal sets are configured so as to be electrically connected by direct contact.

2. The first connector of claim 1, wherein:

the shielding portion includes an electrical connecting contact portion for making contact with a counterpart contact that is an electrical connecting contact portion provided at the shielding portion of the first terminal set adjacent to the first terminal set provided with the shielding portion, or that is the electrical continuity interposer portion serving as the counterpart contact; and the electrical connecting contact portion has a shape projecting toward the counterpart contact.

3. A first connector configured to be connected to a second connector, wherein:

the first connector includes a plurality of first terminal sets;

each of the plurality of first terminal sets includes a first signal terminal and a first ground terminal;

the first signal terminal includes a shielded portion;

the first ground terminal includes a shielding portion;

two adjacent first terminal sets from among the plurality of first terminal sets have the following features:

part of the shielding portion of one of the two adjacent first terminal sets and part of the shielding portion of another of the two adjacent first terminal sets are disposed in a state opposing each other between the shielded portion of the one of the two adjacent first terminal sets and the shielded portion of the other of the two adjacent first terminal sets; and the shielding portion of the one of the two adjacent first terminal sets and the shielding portion of the other of the two adjacent first terminal sets are configured so as to be electrically connected by direct contact, or electrically connected via an electrical continuity interposer portion provided at the second connector, wherein:

the shielding portion includes an electrical connecting contact portion for making contact with a counterpart contact that is an electrical connecting contact portion provided at the shielding portion of the first terminal set adjacent to the first terminal set provided with the shielding portion, or that is the electrical continuity interposer portion serving as the counterpart contact;

the electrical connecting contact portion has a shape projecting toward the counterpart contact, and the electrical connecting contact portion includes a contact point portion that makes contact with the counterpart contact; and a plurality of coupling portions that couple the contact point portion and a portion of the shielding portion other than the electrical connecting contact portion together.

4. A first connector configured to be connected to a second connector, wherein:

the first connector includes a plurality of first terminal sets;

each of the plurality of first terminal sets includes a first signal terminal and a first ground terminal;

the first signal terminal includes a shielded portion;

the first ground terminal includes a shielding portion;

two adjacent first terminal sets from among the plurality of first terminal sets have the following features:

part of the shielding portion of one of the two adjacent first terminal sets and part of the shielding portion of another of the two adjacent first terminal sets are disposed in a state opposing each other between the shielded portion of the one of the two adjacent first terminal sets and the shielded portion of the other of the two adjacent first terminal sets; and the shielding portion of the one of the two adjacent first terminal sets and the shielding portion of the other of the two adjacent first terminal sets are configured so as to be electrically connected by direct contact, or electrically connected via an electrical continuity interposer portion provided at the second connector, wherein:

the plurality of first terminal sets are configured as pairs of first terminal sets disposed to oppose each other in an inter-row direction, with a plurality of pairs arrayed along an array direction;

the shielding portion includes an inter-row direction shielding portion disposed at an inter-row direction inside with respect to the shielded portion, and a pair of array direction shielding portions disposed at both array direction sides with respect to the shielded portion;

two inter-row direction shielding portions are arranged between two shielded portions adjacent in the inter-row direction; and two array direction shielding portions are arranged between two shielded portions adjacent in the array direction.

5. The first connector of claim 4, wherein:

the shielding portion of the one of the two adjacent first terminal sets and the shielding portion of the other of the two adjacent first terminal set-make direct contact with each other at a position between an array direction shielding portion of the one of the two adjacent first terminal sets and an array direction shielding portion of the other of the two adjacent first terminal sets; or the electrical continuity interposer portion is inserted between the array direction shielding portion of the one of the two adjacent first terminal sets and the array direction shielding portion of the other of the two adjacent first terminal sets such that the array direction shielding portions are electrically connected via the electrical continuity interposer portion.

6. The first connector of claim 1, wherein:

the shielded portion includes a contact portion for making contact with the second signal terminal.

7. A first connector configured to be connected to a second connector, wherein:

the first connector includes a plurality of first terminal sets and a movable housing that is movable with respect to a first mounting target to which the first connector is mounted;

each of the plurality of first terminal sets includes a first signal terminal and a first ground terminal;

the first signal terminal includes a shielded portion;

the first ground terminal includes a shielding portion;

the shielded portion and the shielding portion are retained in the movable housing so as to be movable with respect to the first mounting target;

two adjacent first terminal sets from among the plurality of first terminal sets have the following features:

part of the shielding portion of one of the two adjacent first terminal sets and part of the shielding portion of another of the two adjacent first terminal sets are disposed in a state opposing each other between the shielded portion of the one of the two adjacent first terminal sets and the shielded portion of the other of the two adjacent first terminal sets; and the shielding portion of the one of the two adjacent first terminal sets and the shielding portion of the other of the two adjacent first terminal sets are configured so as to be electrically connected by direct contact, or electrically connected via an electrical continuity interposer portion provided at the second connector.

8. A connector set comprising a first connector of claim 1 and a second connector that are mutually connectable, wherein:

the second connector includes a plurality of second signal terminals.

9. A connector set comprising a first connector of claim 2 and a second connector that are mutually connectable, wherein:

the second connector includes a plurality of second signal terminals.

10. A connector set comprising a first connector of claim 4 and a second connector that are mutually connectable, wherein:

the second connector includes a plurality of second signal terminals.

11. A connector set comprising a first connector of claim 7 and a second connector that are mutually connectable, wherein:

the second connector includes a plurality of second signal terminals.

* * * * *